US012688241B2

(12) United States Patent
Sipolins et al.

(10) Patent No.: US 12,688,241 B2
(45) Date of Patent: Jul. 21, 2026

(54) SYSTEMS AND METHODS FOR IDENTIFYING AND MODIFYING RELEVANT CONTENT BASED ON DIMENSIONAL ANALYSIS

(71) Applicant: Adeia Guides Inc., San Jose, CA (US)

(72) Inventors: Aldis Sipolins, Somerville, MA (US); Ning Xu, Irvine, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/901,622

(22) Filed: Sep. 30, 2024

(65) Prior Publication Data

US 2026/0093756 A1     Apr. 2, 2026

(51) Int. Cl.
*G06F 16/00*          (2019.01)
*G06F 16/9038*     (2019.01)

(52) U.S. Cl.
CPC ................................ *G06F 16/9038* (2019.01)

(58) Field of Classification Search
CPC .. G06F 16/9038; G06F 16/9535; G06F 16/93; G06F 16/24578; G06F 16/9536; G06F 16/337
See application file for complete search history.

(56) References Cited

U.S. PATENT DOCUMENTS

| | | | | |
|---|---|---|---|---|
| 9,134,215 | B1 * | 9/2015 | Vignisson | G06N 5/04 |
| 2008/0215571 | A1 * | 9/2008 | Huang | G06F 16/345 |
| | | | | 707/999.005 |

| | | | | |
|---|---|---|---|---|
| 2013/0290110 | A1 * | 10/2013 | LuVogt | G06F 16/9535 |
| | | | | 705/14.66 |
| 2014/0019443 | A1 * | 1/2014 | Golshan | G06F 16/9535 |
| | | | | 707/723 |
| 2014/0259189 | A1 | 9/2014 | Ramachandran | |
| 2018/0052910 | A1 * | 2/2018 | Allen | G06F 16/3329 |
| 2019/0318407 | A1 * | 10/2019 | Giridhari | G06Q 30/0627 |
| 2019/0392330 | A1 * | 12/2019 | Martineau | G06N 5/04 |

OTHER PUBLICATIONS

Collaborative Filtering, Google, online available at <https://developers.google.com/machine-learning/recommendation/collaborative/basics>, retrieved on Mar. 19, 2025, pp. 1-6.

(Continued)

*Primary Examiner* — Syed H Hasan

(74) *Attorney, Agent, or Firm* — HG LAW LLP

(57)          ABSTRACT

Systems and methods are provided herein for providing a personalized selection of modified content items to a user device. Particularly, systems and related methods are disclosed for analyzing content items to determine and store associated dimensions and corresponding sentiments and sentiment intensities and analyzing user behavior to determine and store user preferences comprising a plurality of dimensions and associated user sentiments and user sentiment intensities. Upon receiving a request from a user device for content items about a topic, the system identifies relevant content items, compares the associated dimensions of the identified content items to the user preferences, and modifies the content items accordingly. Following the modification of the content items, the system generates the modified content items for display at the user device.

18 Claims, 13 Drawing Sheets

(56) References Cited

OTHER PUBLICATIONS

How Amazon continues to improve the customer reviews experience with generative AI, Amazon, Online available at <https://www.aboutamazon.com/news/amazon-improves-customer-reviews-with-generative-ai>, retrieved on Mar. 19, 2025, pp. 1-10.
Matrix Factorization Techniques for Recommender Systems, Datajobs, IEEE Computer Society, Aug. 2009, pp. 42-49.
The Future of Reviews: Amazon AI Summaries, Yogi, online available at <https://www.meetyogi.com/post/the-future-of-reviews-amazon-ai-summaries>, retrieved on Mar. 19, 2025, pp. 1-15.

* cited by examiner

100

110

Content Item 1

— Topic

Textual Segment 1

Textual Segment 2

Abstract: This Study Examines the <u>impact of diet on coronary heart disease (CHD)</u>, <u>focusing on processed foods and a vegan diet. Analyzing data from 5,000 adults over 10 years, we found that high consumption of processed foods significantly increased the risk of CHD, particularly those high in processed meats, refined sugars, and trans fats.</u> <u>Conversely, adherence to a vegan diet, rich in fruits, vegetables, whole grains, and nuts, was associated with a reduced risk of CHD. These findings highlight the need for public health strategies to reduce processed food intake and promote plant-based diets to prevent CHD.</u> Background: In past studies…

| Content Item | Topic | Author | Textual Segment 1 | Textual Segment 2 | Textual Segment N |
|---|---|---|---|---|---|
| 1 | Impact of Diet on Coronary Heart Disease | Dr. Garcia | Processed Food (— —) | Vegan(++) | ··· |
| 2 | Climate Change | Dr. Sanchez | Fossil Fuels (——) | Vegan (+) | ··· |
| 3 | Type 2 Diabetes | Dr. Arroyo | Vegan (++) | Insulin Pump(+) | ··· |

102a

Content Item Database

FIG. 1A

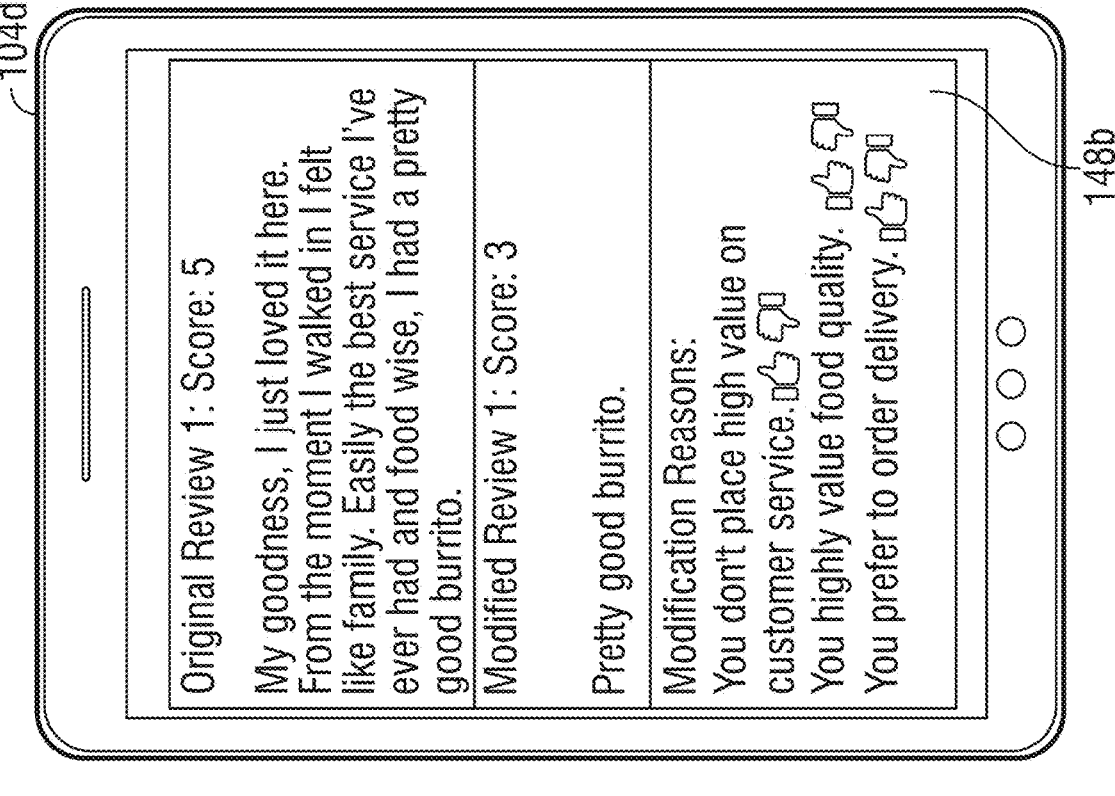

Original Review 1: Score: 5

My goodness, I just loved it here. From the moment I walked in I felt like family. Easily the best service I've ever had and food wise, I had a pretty good burrito.

Modified Review 1: Score: 3

Pretty good burrito.

Modification Reasons:
You don't place high value on customer service.
You highly value food quality.
You prefer to order delivery.

148b

Original Review 1: Score: 5

My goodness, I just loved it here. From the moment I walked in I felt like family. Easily the best service I've ever had and food wise, I had a pretty good burrito.

Modified Review 1: Score: 4

Best service I've ever had and a pretty good burrito.

Modification Reasons:      150a     150b
You prefer in-person dining.     150d
                           150c
You value good service.
                       150f
You highly value food quality.     150e
You prefer spicy food.
        150g           150h 148a 104d 104c

FIG. 1E

Figure 2B:
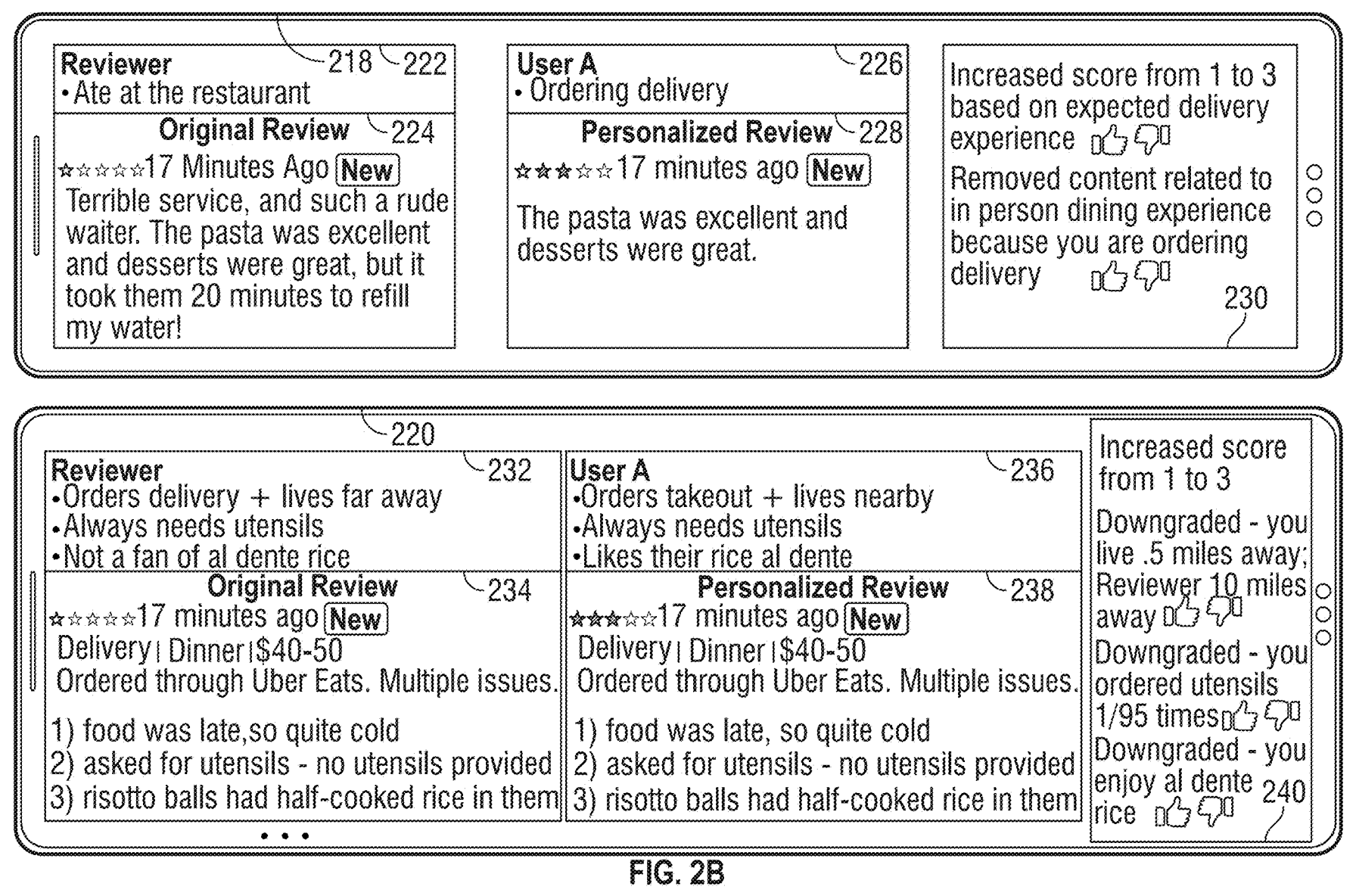

Reviewer 218 222
• Ate at the restaurant

Original Review 224
★★★☆☆17 Minutes Ago [New]

Terrible service, and such a rude waiter. The pasta was excellent and desserts were great, but it took them 20 minutes to refill my water!

User A 226
• Ordering delivery

Personalized Review 228
★★★☆☆17 minutes ago [New]

The pasta was excellent and desserts were great.

230
Increased score from 1 to 3 based on expected delivery experience 👍👎

Removed content related to in person dining experience because you are ordering delivery 👍👎

---

Reviewer 220
• Orders delivery + lives far away
• Always needs utensils
• Not a fan of al dente rice

Original Review 232
★★★☆☆17 minutes ago [New]
Delivery | Dinner | $40-50
Ordered through Uber Eats. Multiple issues.

1) food was late, so quite cold
2) asked for utensils - no utensils provided
3) risotto balls had half-cooked rice in them
234

User A 236
• Orders takeout + lives nearby
• Always needs utensils
• Likes their rice al dente

Personalized Review 238
★★★☆☆17 minutes ago [New]
Delivery | Dinner | $40-50
Ordered through Uber Eats. Multiple issues.

1) food was late, so quite cold
2) asked for utensils - no utensils provided
3) risotto balls had half-cooked rice in them 240
Increased score from 1 to 3

Downgraded - you live .5 miles away; Reviewer 10 miles away 👍👎

Downgraded - you ordered utensils 👍👎

Downgraded - you 1/95 times 👍👎

Downgraded - you enjoy al dente rice 👍👎

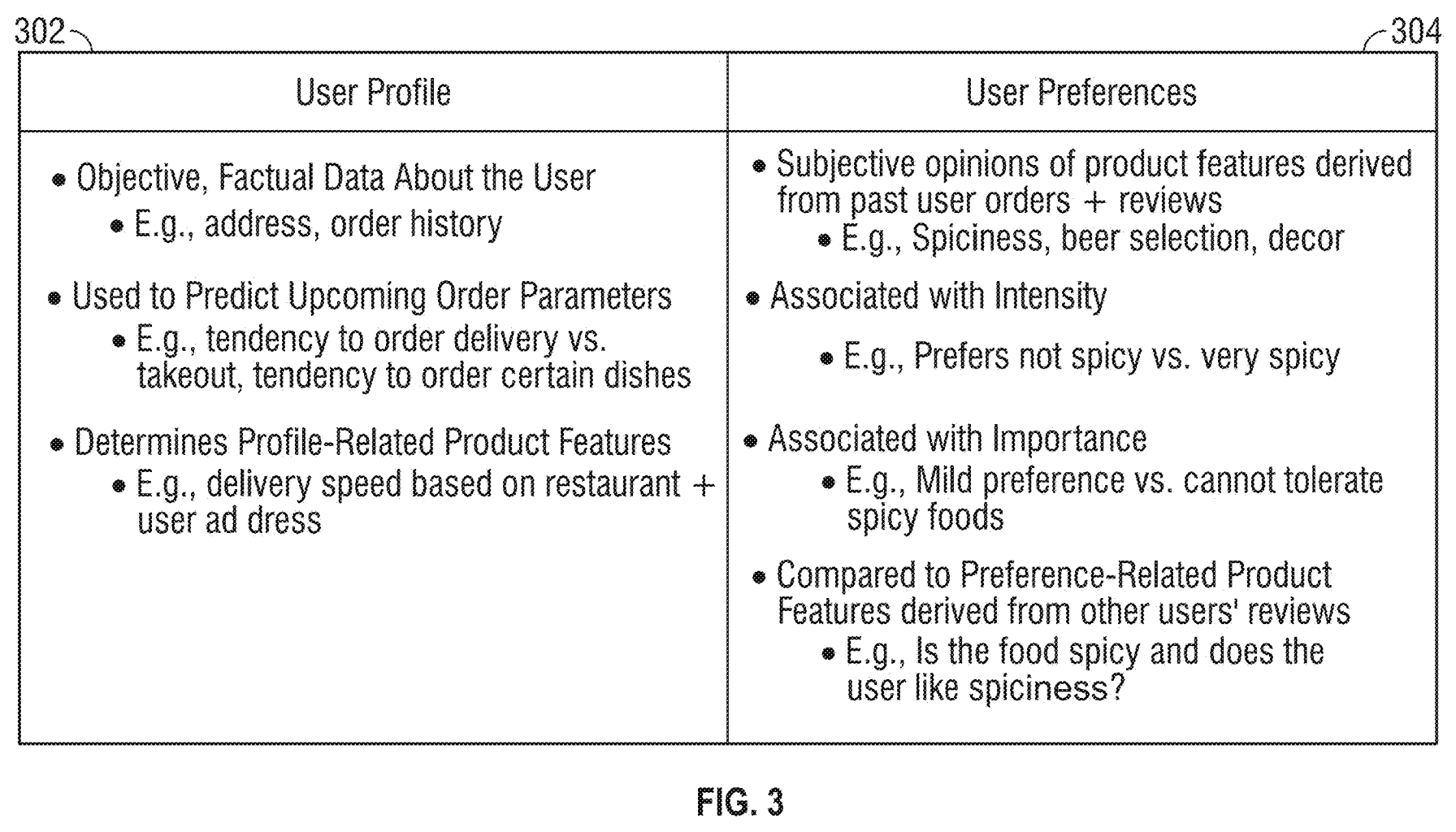

User Profile

- Objective, Factual Data About the User
  - E.g., address, order history

- Used to Predict Upcoming Order Parameters
  - E.g., tendency to order delivery vs. takeout, tendency to order certain dishes

- Determines Profile-Related Product Features
  - E.g., delivery speed based on restaurant + user ad dress

304

User Preferences

- Subjective opinions of product features derived from past user orders + reviews
  - E.g., Spiciness, beer selection, decor

- Associated with Intensity
  - E.g., Prefers not spicy vs. very spicy

- Associated with Importance
  - E.g., Mild preference vs. cannot tolerate spicy foods

- Compared to Preference-Related Product Features derived from other users' reviews
  - E.g., Is the food spicy and does the user like spiciness?

FIG. 3

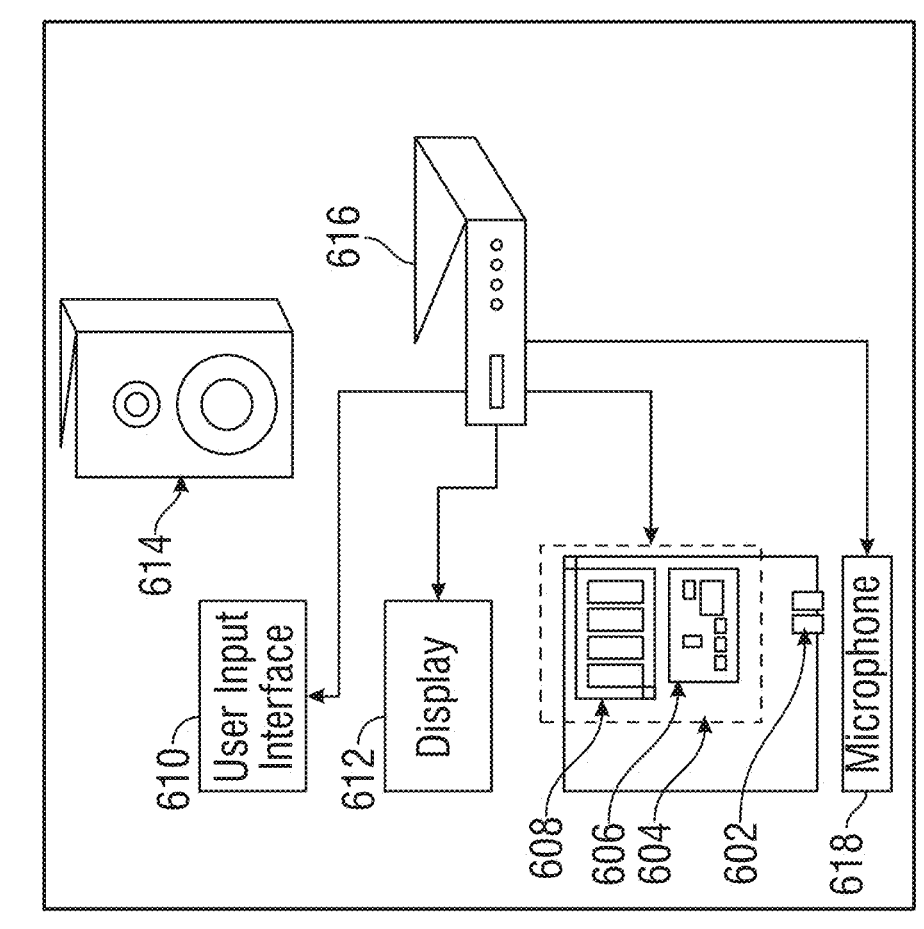
FIG. 6
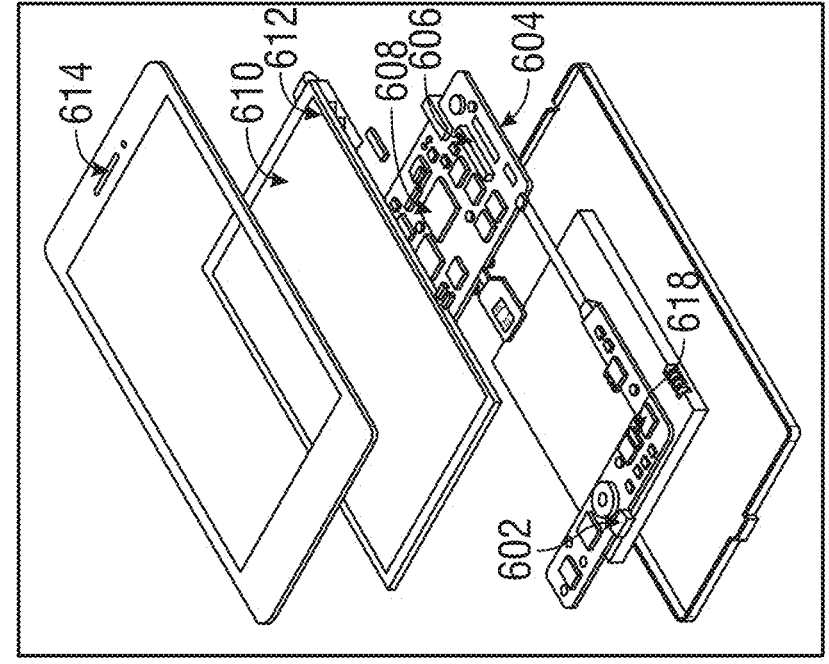

Figure 8:
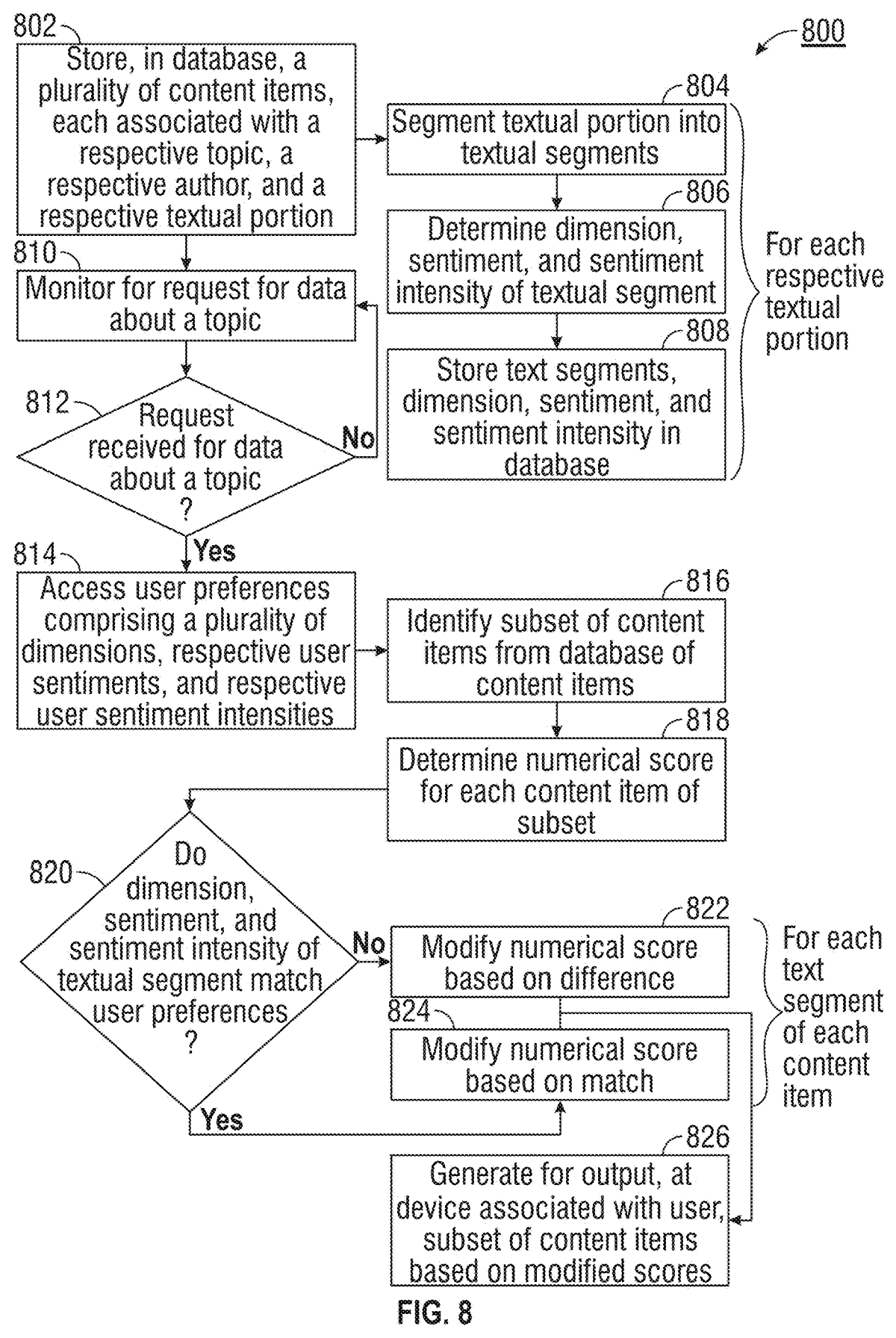

802
Store, in database, a plurality of content items, each associated with a respective topic, a respective author, and a respective textual portion 804
Segment textual portion into textual segments 806
Determine dimension, sentiment, and sentiment intensity of textual segment 808
Store text segments, dimension, sentiment, and sentiment intensity in database For each respective textual portion 810
Monitor for request for data about a topic 812
Request received for data about a topic?    No Yes 814
Access user preferences comprising a plurality of dimensions, respective user sentiments, and respective user sentiment intensities 816
Identify subset of content items from database of content items 818
Determine numerical score for each content item of subset 820
Do dimension, sentiment, and sentiment intensity of textual segment match user preferences?    No 822
Modify numerical score based on difference 824
Modify numerical score based on match Yes For each text segment of each content item 826
Generate for output, at device associated with user, subset of content items based on modified scores

SYSTEMS AND METHODS FOR IDENTIFYING AND MODIFYING RELEVANT CONTENT BASED ON DIMENSIONAL ANALYSIS

BACKGROUND

This disclosure is related to techniques for operating content item databases, and more particularly to quantifying otherwise un-quantified dimensions of the content items; analyzing the quantified dimensions to perform operations, such as modifying stored content items and information (e.g., scores) associated with the content items; and responsive to electronic requests communicated over a network, delivering uniquely relevant content items.

SUMMARY

In some approaches, digital content-providing systems, such as servers of cable television companies, news outlets, web search engines, social media applications, and more, store content items within a database and provide the stored content items to user devices. In some embodiments, digital content-providing systems analyze the stored content items to determine additional aspects related to each content item (e.g., recency of publication, associated keywords, topics, etc.) and store these aspects within their database. For example, a digital content-providing system can download text, images, and videos from pages on the Internet with automated programs called crawlers; analyze the text, images, and video files on the page; and store the information in an index, which may be stored as a large database. Additionally, digital content-providing systems can be configured to process users' interface requests for specific content items, such as content items associated with a specific topic, published in a specific timeframe, or even created by a specific author. For example, a digital content-providing system comprising a database of scientific articles may receive a request from a user device to conduct a search for "early-onset Alzheimer disease" and, in response, the system identifies, within the database, a plurality of articles corresponding to the search "early-onset Alzheimer disease," and generate for output, at the user device, a plurality of links and short descriptions (e.g., abstracts).

With the proliferation of digital content, identifying and providing content items relevant to a user profile become increasingly challenging. In some approaches, digital content-providing systems analyze user interface interactions with content items to determine user profile preferences and subsequently utilize these preferences to better provide relevant content items to user devices. For example, in response to a content-providing system generating for display at a user device the shows "Young Sheldon" and "Grace and Frankie," the content-providing system may generate for display a recommendation for another sitcom, such as "Seinfeld." However, in such an instance, the content provider system is utilizing broad attributes of content items to determine specific recommendations, thus failing to account for exact user preferences and identifying irrelevant content items for recommendation. For example, the content-providing system is failing to identify the specific user profile preferences for physics (e.g., as could be identified based on the user interface interaction with "Young Sheldon") and elderly content (e.g., as could be identified based on the user interface interaction with "Grace and Frankie"), and subsequently utilizing a grossly generalized user profile preference for sitcoms to identify an irrelevant content item for recommendation (e.g., "Seinfeld").

In other approaches, digital content-providing systems attempt to determine the relevancy of a content item to a user profile based on factors such as a user device's location, language, or type of device. For example, in response to receiving the search input "bicycle repair shop" from a user device located in Los Angeles, a content-providing system may identify a set of results corresponding to bicycle repair shops in Los Angeles. However, without a database of specific user profile information and preferences to leverage, the content-providing system is identifying irrelevant results as the utilized framework for relevancy lacks the vital user profile information corresponding to the preference of supporting businesses located in Ventura County.

Additionally, in some approaches, digital content-providing systems leverage collaborative filtering to identify content that may be of relevance to a user profile. For example, if a particular user profile comprises an indication of a liking of three specific movies, a content-providing system may identify six other user profiles comprising indications of likings for those same three specific movies, mine those six user profiles to identify a fourth movie based on a majority of the six user profiles comprising indications of liking the fourth movie, and provide a recommendation at the particular user device to watch the fourth movie. However, in this approach, the content-providing system is failing to consider which dimension (e.g., genre, cast, year of release, length, themes, etc.) of each movie resulted in the user profiles' comprising the various indications of liking the movies, leading to a potentially irrelevant fourth movie being generated for display at the particular user device.

Moreover, in some approaches, digital content-providing systems fail to indicate at user devices the aspects or dimensions of a content item that have led to the content item being identified as relevant to the user profiles. Upon receiving a search request for content items from a user device, a digital content-providing system may utilize an algorithm to identify and generate for display, at the user device, a subset of content items. However, the digital content-providing system refrains from indicating, at the user device, which aspects of each content item contributed to its identification as relevant to the user profile, for example by modifying textual portions or numerical scores of content items to highlight aspects of the content item that are relevant to the user profile, resulting in excess user interface interactions with irrelevant content items thus wasting energy and bandwidth. Additionally, due to a combination of the generalized content item selection by the digital content-providing system (e.g., failing to rank content items for selection based on score modification derived from user preferences) and the inefficient display of content items generated at user devices (e.g., displaying unmodified content items that fail to provide an indication of relevant aspects of the selected content item), the digital content-providing system ultimately receives an increased number of user interface requests for specific content items, wasting even more energy and bandwidth. There is a need for a more complete approach to determining the relevance of content items, updating and ranking content items in the database, and improving user interface for indicating the aspects of a content item that were changed or updated based on relevance to user profiles.

To help address these problems, systems and methods are disclosed herein for identifying content items that are relevant to a user and modifying the content items to highlight the aspects of the content items that are identified as relevant to the user profile. In some embodiments, the content-providing system stores, in a database, a plurality of content items wherein each content item is associated with a respective topic, a respective author, and a respective textual portion. In some implementations, for each respective textual portion of each content item of the plurality of content items, the content-providing system segments the respective textual portion into a plurality of textual segments; determines, for each textual segment of each respective textual portion, a respective dimension (e.g., a topic), a respective sentiment (e.g., a positive or negative opinion), and a respective sentiment intensity score (e.g., a score on a scale from −1 to 1 corresponding to strength of sentiment); and causes the respective dimension, the respective sentiment, and the respective sentiment intensity score for each textual segment to be stored in the database. In some embodiments, the content-providing system receives, from a device associated with a user profile, a request for data about a topic. In some implementations, the content-providing system accesses stored user preferences, comprising a plurality of dimensions, a respective user sentiment for each dimension, and a respective user sentiment intensity score for each dimension, of the user profile. In some embodiments, the content-providing system identifies a subset of the plurality of content items based at least in part on the topic. In some implementations, the content-providing system identifies a numerical score for each content item of the subset. In some embodiments, the content-providing system generates a modified numerical score for a particular content item from the subset based at least in part on comparing the respective dimension, the respective sentiment, and the respective sentiment intensity score for each textual segment of the particular content item to the plurality of dimensions, the respective user sentiment for each dimension, and the respective user sentiment intensity score for each dimension. In some implementations, the content-providing system generates for output, at the device associated with the user profile, based at least in part on the modified numerical score, the particular content item.

Such systems and methods, for example, process data to determine associated dimensions, sentiments, and sentiment intensity scores for both content items and user profiles. Further, such systems and methods leverage the processed data to accurately identify content items of relevance to user profiles, and subsequently modify the identified content items to generate modified content items, personalized to a user profile. Thus, the content-providing system streamlines the process for identifying and generating for display relevant content, effectively decreasing the instances of user interface interactions with irrelevant content items and the number of received user interface requests for specific content items, thereby saving energy and bandwidth.

Additionally, in some embodiments, the content-providing system generates for output, at the device associated with the user profile, the subset of content items arranged based at least in part on the modified numerical score of the particular content item. In some implementations, the content-providing system stores, for the respective author of each content item, a set of dimensions, a respective author sentiment for each dimension, and a respective author sentiment intensity score for each dimension. In some embodiments, the content-providing system identifies the subset of content items from the plurality of content items by comparing (a) the plurality of dimensions, the respective user sentiment for each dimension, and the respective user sentiment intensity score for each dimension, and (b) the set of dimensions, the respective author sentiment for each dimension, and the respective author sentiment intensity score for each dimension. In some implementations, the content-providing system stores a plurality of reviews, each review associated with a respective reviewing user and a respective review score, and the system determines the numerical score for each content item by accessing the respective review scores. In some embodiments, the content-providing system determines the numerical score for each content item by ranking each content item based at least in part on comparing the request for data about the topic to the respective textual portion of each content item of the subset of content items to determine a respective relevance to the topic.

In some implementations, the content-providing system generates a modified respective textual portion of the particular content item by modifying at least one textual segment of the particular content item based at least in part on comparing the respective dimension, the respective sentiment, and the respective sentiment intensity score for each text segment of the particular content item to the plurality of dimensions, the respective user sentiment for each dimension, and the respective user sentiment intensity score for each dimension. In some embodiments, the content-providing system subsequently generates for output, at the device associated with the user, the particular content item comprising the modified respective textual portion of the particular content item. In some embodiments, when the content-providing system modifies the textual portion and/or the numerical score of the particular content item, trust in the content-providing system decreases due to a perceived lack of transparency and trickery. Thus, in some implementations, the content-providing system generates for output an indication that the respective textual portion and/or the respective numerical score of the particular content item was modified, thereby ensuring transparency and an increased trust in the content-providing system. In some embodiments, the content-providing system provides a user-selectable option corresponding to the modification of the particular content item (e.g., the modification of the at least one textual segment and/or the numerical score); receives a selection, from the device associated with the user profile, of the user-selectable option; and generates for display, at the device associated with the user profile, the unmodified particular content item and an indication of a reason for the modification of the particular content item. In some implementations, the content-providing system generates for display, at the device associated with the user profile, additional user-selectable options corresponding to a user approval or disapproval of any modifications made (e.g., modification of the numerical score, modification of a textual segment) to the particular content item and/or user approval or disapproval of any reasons for the modifications made to the particular content item. In some embodiments, the content-providing system determines the stored user preferences of the user based on user activity across a plurality of applications.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1A depicts an illustrative system for determining and storing textual segments and corresponding dimensions, sentiments, and sentiment intensity scores, in accordance with some embodiments of this disclosure.

FIG. 1E depicts an illustrative system for providing content item modification details to a user device, in accordance with some embodiments of this disclosure.

FIG. 2B depicts an illustrative system for providing content item modification details to a user device, in accordance with some embodiments of this disclosure.

FIG. 3 is a chart categorizing different elements of stored user information, in accordance with some embodiments of this disclosure.

FIG. 6 shows illustrative devices and systems for providing a personalized selection of modified content items to a user device, in accordance with some embodiments of this disclosure.

FIG. 8 is flowchart of a detailed illustrative process for providing a personalized selection of modified content items to a user device, in accordance with some embodiments of this disclosure.

DETAILED DESCRIPTION

Figure 1B:
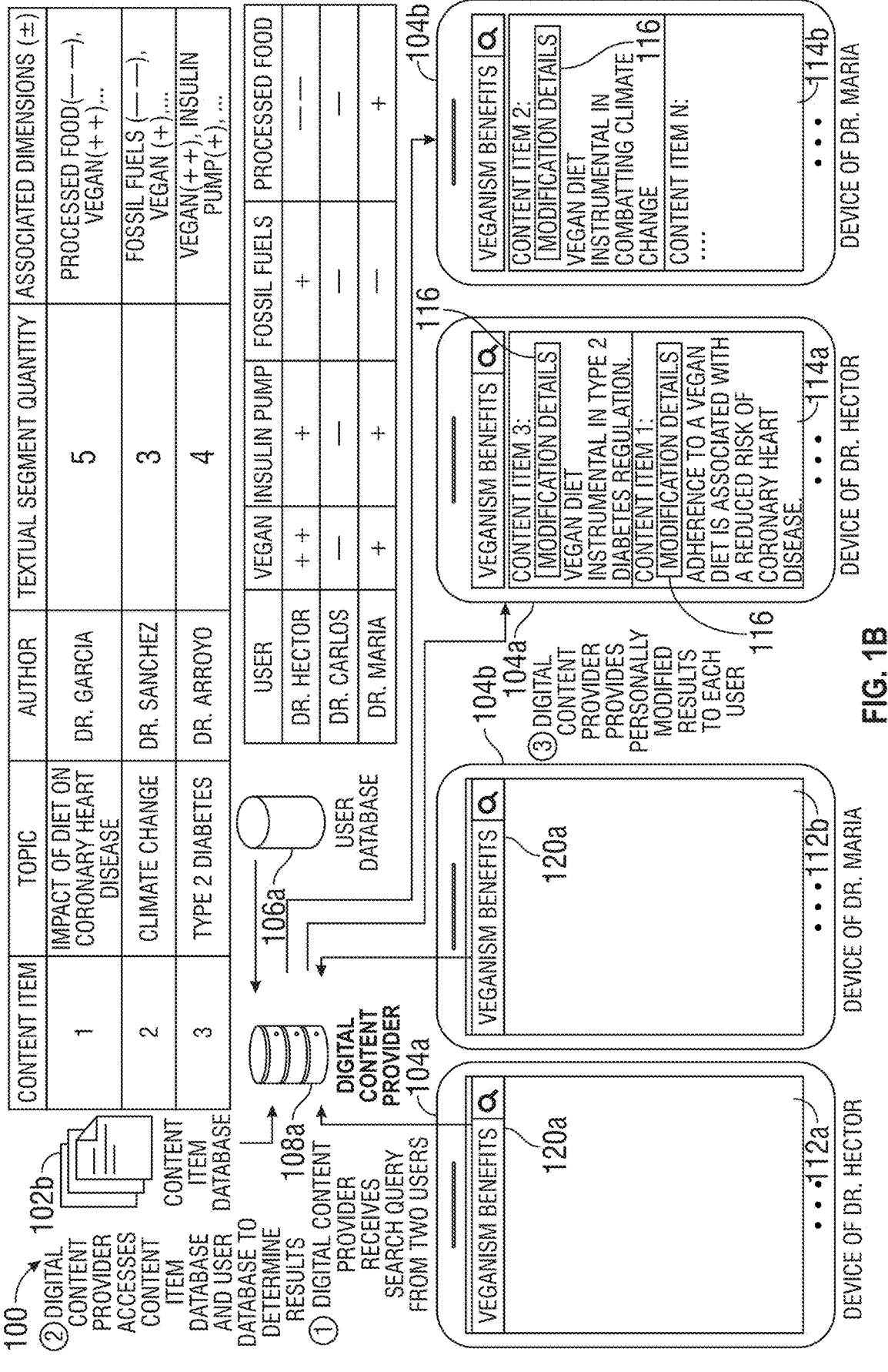
FIG. 1B depicts an illustrative system for providing a personalized selection of modified content items to a user device, in accordance with some embodiments of this disclosure.

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

The disclosed methods and systems enhance database storage selection, network delivery, and presentation of content items to user devices. The system includes several components designed to analyze and modify content items based on dimensions stored in association with each of the content items, the user profile associated with the user device, and the publisher and/or author of the content items, to ensure streamlined content selection and presentation to users.

FIGS. 1A-1E depict system 100 for providing a personalized selection of modified content items to a user device, in accordance with some embodiments of this disclosure. In some embodiments, system 100 (also referred to herein as "the system") may comprise or correspond to and/or be implemented by the server of a digital content provider (e.g., news outlets, search engines, social media applications, ecommerce website), any suitable digital content provider, or any other suitable device, service, or platform, or any combination thereof. The system may comprise or correspond to a content-providing application (e.g., instructions stored in non-transitory memory that when executed by control circuitry, cause transmittal or analysis of data and generation of user interfaces to be displayed) (e.g., Yelp™), which may be executed at least in part on user devices 104a, 104b, 104c, or 104d and/or at one or more remote servers (e.g., server 704 of FIG. 7 and/or media content source 702 of FIG. 7) and/or at or distributed across any of one or more other suitable computing devices or network equipment, in communication over any suitable number and/or types of networks (e.g., the Internet, cellular networks, satellite networks, and/or any other suitable networks). The application may be configured to perform the functionalities (or any suitable portion of the functionalities) described herein. In some embodiments, the application and/or the system may be a stand-alone application or may be incorporated as part of any suitable application or system. The application and/or system may comprise or employ any suitable number of displays, sensors or devices such as those described in FIGS. 1-8, or any other suitable software and/or hardware components, or any combination thereof.

In some embodiments, the application may be installed at or otherwise provided to a particular computing device, may be provided via an application programming interface (API), or may be provided as an add-on application to another platform or application. In some embodiments, software tools (e.g., one or more software development kits (SDKs)) may be provided to any suitable party, to enable the party to implement the functionalities described herein.

Figure 7:
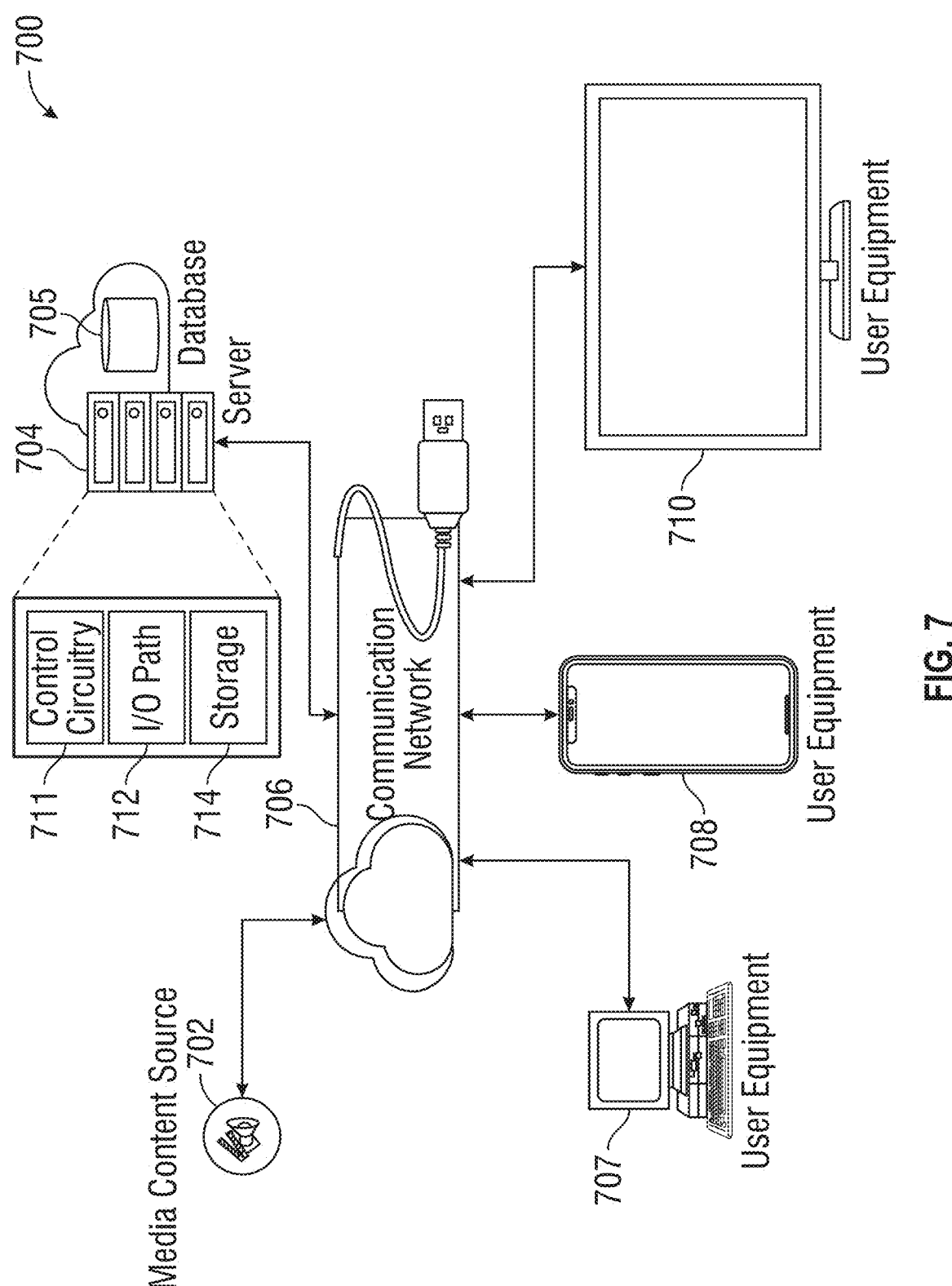
FIG. 7 shows illustrative devices and systems for providing a personalized selection of modified content items to a user device, in accordance with some embodiments of this disclosure.

In some implementations, system 100 may comprise user devices 104a, 104b, 104c, 104d of FIGS. 1A-1E, or any number of devices, comprising software and hardware components, such as, for example, control circuitry and memory, and may correspond to one or more of devices 707, 708, and/or 710 of FIG. 7. In some embodiments, the control circuitry of user devices 104a, 104b, 104c, or 104d is control circuitry 604, as further described in FIG. 6 below. The hardware components and applications installed on user devices 104a, 104b, 104c, or 104d are managed by an operating system (OS) (e.g., iOS, Android, webOS). System 100 may execute the process depicted in FIGS. 1A-1E based on instructions stored in non-transitory memory (e.g., non-transitory memory 608 of FIG. 6, or storage 714 of FIG. 7). System 100 enables user devices 104a, 104b, 104c, and 104d of respective users (e.g., Dr. Hector, Dr. Maria, jano-heyno, cdpeeps13) to access digital content provided by a digital content provider (e.g., digital content provider 108a, 108b) over any suitable network (e.g., the Internet, cellular networks, or any other suitable network, or any combination thereof). In some approaches, user devices 104a, 104b, 104c, and 104d access digital content over communication network 706 of FIG. 7. System 100 may access the data provided by other applications on user devices 104a, 104b, 104c, or 104d (e.g., Messages, Facebook™ Messenger, Google™ Messages, applications native to the OS or applications downloaded to the OS, or any other suitable application, or any suitable combination thereof), one or more of which may be provided by one or more servers. System 100 may access the applications installed on user devices 104a, 104b, 104c, or 104d by using an API, a software interface that allows two or more applications to communicate with each other.

In some embodiments, any of user devices 104a, 104b, 104c, and 104d may be a mobile device such as, for example, a smartphone or tablet. In some embodiments, any of user devices 104a, 104b, 104c, and 104d may comprise or correspond to a laptop computer, a personal computer, a desktop computer, a smart television, a smart watch or wearable device, smart glasses, a stereoscopic display, a wearable camera, extended reality (XR) glasses, XR goggles, a near-eye display device, or any other suitable user equipment or computing device, or any combination thereof.

As shown in FIG. 1A, in some embodiments, system 100 comprises content item database 102a. In some implementations, the system stores content item database 102a in non-transitory memory, content item database 102a comprising content item 1, content item 2, and content item 3, or any number of content items, as well as a respective topic, a respective author, a respective textual segment 1, a respective textual segment 2, or any number of textual segments, for each content item. In some embodiments, the system determines and stores, for each respective textual segment of each content item, a dimension (e.g., topic of the textual segment), a sentiment (e.g., positive (+) or negative (−)), and a sentiment intensity score (e.g., ++++, −−, 0.8, −0.2, etc.). While the sentiment is shown as a positive or negative indicator (e.g., a plus sign or a minus sign) and the determined sentiment intensity score is shown as a degree of positive or negative intensity (e.g., two plus signs versus one plus sign) in conjunction with the determined sentiment in FIG. 1A, the determined sentiment and determined sentiment intensity scores may be stored in any suitable manner (e.g., as a numerical value, as two separate, unique values, as a single value that embodies both sentiment and sentiment intensity). For example, in some embodiments, the system calculates a value in the range from −1 to 1 corresponding to the sentiment and the sentiment intensity score, with −1 corresponding to a negative sentiment and the highest sentiment intensity and 1 corresponding to a positive sentiment and the highest sentiment intensity. In some implementations, the system (e.g., system 100 of FIGS. 1A-1E) determines and stores any of a dimension, a sentiment, a sentiment score, a sentiment intensity score, or any other suitable parameter for further quantifying a content item. In some embodiments, the system assigns a score (e.g., between −1 to 1, −10 to 10, 0 to 100, or any other suitable range) to each text segment corresponding to any of sentiment, sentiment intensity, or any other suitable quantization of the text segment. Additionally, in some implementations, a plurality of dimensions are extracted from a single textual segment, a sentiment and a sentiment intensity score are determined for each dimension of the plurality of dimensions, and all of the dimensions, sentiments, and sentiment intensity scores are stored in content item database 102a.

In some embodiments, content item database 102a comprises any number of content items and any number of respective textual segments for each content item. In some implementations, content item database 102a stores any number of aspects related to each content item (e.g., publication date, associated keywords, associated images, associated videos, location of creation, etc.). In some embodiments, content item database 102a stores information related to the author of each content item, such as a set of dimensions, a respective author sentiment for each dimension, and a respective author sentiment intensity score for each dimension. In some embodiments, system 100 determines the author of each content item by any of determining a user profile the content item was received from, accessing a database storing author information, accessing metadata associated with the content item, analyzing the textual portion of the content item to identify a cited author, or any other suitable method. In some implementations, system 100 determines the set of dimensions and the respective author sentiments and sentiment intensity scores based on input received from the device of the respective author. In some embodiments, system 100 determines the set of dimensions and the respective author sentiments and sentiment intensity scores based on analysis of content items authored by the respective author. For example, because system 100 determined that content item 1 has an intense negative sentiment (e.g., a sentiment of − and/or a sentiment intensity score of −−) towards processed food, system 100 stores the dimension "Processed Food" and the corresponding sentiment and sentiment intensity score as determined from the content item as a dimension, author sentiment, and author sentiment intensity score for Dr. Garcia, the author of content item 1. In some implementations, system 100 determines the set of dimensions, and the respective author sentiments and sentiment intensity scores based on any suitable source of information such as publicly available articles written on the respective author, publicly available videos of interviews of the author, or any other source of information on the respective author.

For example, in some embodiments, system 100 extracts the set of dimensions, and the respective author sentiments and sentiment intensity scores from the social media profiles of the respective author. For example, if a social media profile of Dr. Garcia contained a post stating "Climate change is a total hoax. Anyone who says differently is a liar," system 100, in response, stores the dimension "Climate Change" and a respective negative author sentiment (e.g., −) and a respective high intensity author sentiment intensity score (e.g., −−−, −1, −98, etc.).

In some implementations, each content item in content item database 102a comprises a textual portion, such as textual portion 110 of content item 1. In some embodiments, system 100 analyzes the textual portion of each content item to extract the textual segments, and the associated dimensions, sentiments, and sentiment intensity scores for each textual segment. For example, system 100 extracts textual segment 1 (e.g., "high consumption of processed foods significantly increased the risk of CHD") from textual portion 110 and further determines Textual Segment 1 to be associated with the dimension "Processed Foods," the sentiment of Textual Segment 1 to be negative (e.g., −), and the sentiment intensity score of textual segment 1 to be two (e.g., −−). Further, for example, system 100 stores each of the textual segment 1, the determined dimension, the determined sentiment, and the determined sentiment intensity score in content item database 102a. In some implementations, system 100 extracts the textual portion of the content item directly from the content item, such as when the content item is a scientific article, a blog post, a review of a product or item, or any other suitable content item. In some embodiments, the textual portion of a content item may be extracted from an audio of the content item. For example, if the content item is a podcast, system 100 transcribes the audio of the podcast into a textual portion and subsequently analyzes the transcribed textual portion.

In some implementations, system 100 analyzes a large dataset, extracts key points from the text, clusters these points into different dimensions, and assigns individual scores to each dimension. In some embodiments, system 100 cleans the text data to remove extraneous aspects of the text data, such as special characters or filler words that contain no meaning. In some implementations, system 100 utilizes any of named entity recognition (NER), aspect-based sentiment analysis (ABSA), machine learning (ML), natural language processing (NLP), text mining, or any other suitable textual analysis protocols to identify and categorize key phrases related to different dimensions. In some embodiments, pre trained language models such as bidirectional encoder representations from transformers (BERT) or generative pre trained transformers (GPT) are used to extract relevant phrases and determine their sentiment, effectively clustering the text into dimensions. In some embodiments, system 100 clusters the text into predefined dimensions. In some implementations, when predefined clusters are not available, system 100 utilizes an unsupervised learning approach to identify clusters within the content item data. In some implementations, system 100 assesses sentiment intensity by utilizing tools such as valence aware dictionary and sentiment reasoner (VADER) or custom-trained sentiment classifiers. In some embodiments, system 100 assigns a sentiment and a sentiment intensity score via linear mapping or machine learning regression models.

In some embodiments, system 100 analyzes other aspects of the content item to extract dimensions, sentiments, and sentiment intensity scores. For example, if content item database 102a contains images, system 100 utilizes image analysis tools, such as vision transformers (ViTs), generative adversarial networks (GANs), or any other suitable image analysis tool, to extract dimensions and subsequently determine a sentiment and/or a sentiment intensity score. In some embodiments, system 100 may store videos, podcasts, images, audio files, text data, and/or any other suitable content items or combination of content in content item database 102a.

As shown in FIG. 1B, in some embodiments, system 100 generates for display user interface 112a on user device 104a (e.g., the device of Dr. Hector) and user interface 112b on user device 104b (e.g., the device of Dr. Maria). In some embodiments, user device 104a is associated with a user profile of Dr. Hector, and user device 104b is associated with a user profile of Dr. Maria. In some implementations, system 100 generates for display search bar 120a on user interfaces 112a and 112b. In some embodiments, system 100 receives the search input "Veganism Benefits" from both user device 104a and user device 104b. In some implementations, system 100 receives search input via any suitable method, such as selection of user-selectable inputs (e.g., via selection of letters on a keyboard displayed on user interface 112a or 112b), a voice command, or any other suitable method or combination thereof. In some embodiments, system 100 receives the search input from user device 104a and user device 104b and transmits the search input to the servers of digital content provider 108a (e.g., a scientific article provider).

In some implementations, the servers of digital content provider 108a, in response to receiving the search input "Veganism Benefits," accesses content item database 102b and user database 106a. In some embodiments, content item database 102b is content item database 102a of FIG. 1A and content item 1 of content item database 102b is content item 1 of FIG. 1A. In some implementations, content item database 102b comprises each of content item 1, content item 2, content item 3, and a respective topic, a respective author, a respective textual segment quantity, and respective associated dimensions and corresponding sentiments and/or sentiment intensity scores. For example, system 100 comprises content item database 102b comprising content item 1, the topic of content item 1 (e.g., Impact of Diet on Coronary Heart Disease), the author of content item 1 (e.g., Dr. Garcia), the quantity of textual segments of content item 1 (e.g., 5), the associated dimensions of content item 1 (e.g., Processed Foods, Vegan), and a sentiment and sentiment intensity score for each associated dimension (e.g., Processed Food (−), Vegan (++)). It should be appreciated that the content item database 102b depicted in FIG. 1B is an illustrative example, and content item database 102b may store any number of content items (e.g., articles, posts, videos, etc.) and any type of suitable data corresponding to the content items in any suitable matter. For example, in some implementations, system 100 stores content item database 102b comprising independently stored textual segments, associated dimensions, sentiments, and/or sentiment intensity scores, and any other suitable aspect of each content item, such as publication date, publisher, country of origin, language of the content item, various versions of the content item (e.g., in different languages or formats), image data, audio data, or other content items determined to be associated with the content item.

In some embodiments, system 100 stores user database 106a comprising a plurality of user preferences corresponding to a plurality of users. As shown in FIG. 1B, in some embodiments, user database 106a comprises data corresponding to the users Dr. Hector, Dr. Carlos, and Dr. Maria, and associated dimensions and corresponding sentiments and sentiment intensity scores for each user. For example, system 100 stores user database 106a comprising a user profile for Dr. Hector, a Vegan sentiment and sentiment intensity score corresponding to Dr. Hector (e.g., ++), an Insulin Pump sentiment and sentiment intensity score corresponding to Dr. Hector (e.g., +), a Fossil Fuels sentiment and sentiment intensity score corresponding to Dr. Hector (e.g., +), and a Processed Food sentiment and sentiment intensity score corresponding to Dr. Hector (e.g., −−). It should be appreciated that the user database 106a depicted in FIG. 1B is an illustrative example, and user database 106a may store any number of users and any type of suitable data corresponding to the users in any suitable matter. For example, in some implementations, system 100 stores user database 106a comprising a location of each user, a plurality of user profiles associated with each user (e.g., social media accounts), contact information of each user (phone number, email address, address), and any other suitable information of each user.

In some embodiments, system 100 mines the data stored in user database 106a from user activity across a plurality of applications. For example, in some implementations, system 100 analyzes the content consumption behavior of a user across a plurality of applications (e.g., social media applications, podcast applications, music applications, streaming applications, etc.) corresponding to a plurality of digital content provider services as well as content creation by the user (e.g., social media posts) to determine dimensions and corresponding user sentiment and user sentiment intensity scores. For example, if system 100 determines, based on the user profiles of a user across a plurality of streaming platforms, that the user exclusively watches sitcoms on the plurality of streaming platforms, system 100 stores the dimension "Sitcom" with a positive user sentiment (e.g., +) and a high user sentiment intensity score (e.g., + + + +) in user database 106*a*. Further, for example, if system 100 accesses a post authored by the user on a social media account of the user that states "I hate poetry. It shouldn't exist and I would sooner eat a rock than read a poem," system 100, in response, stores the dimension "Poetry" with a negative user sentiment (e.g., –) and a high user sentiment intensity score (e.g., – – – –) in user database 106*a*. In some implementations, system 100 monitors user communications to extract dimensions and corresponding user sentiment and user sentiment intensity scores. For example, if system 100 detects that the phone number associated with the user has sent a message stating "I will not be joining for dinner. All the food there is so spicy and you know I can't handle spice," system 100, in response, stores the dimension "Spiciness" with a negative user sentiment (e.g., –) and a high user sentiment intensity score (e.g., – – –) in user database 106*a*.

In some implementations, the servers of digital content provider 108*a* identify a subset of content items from content item database 102*b* that correspond to the received search input (e.g., "Veganism Benefits"). In some embodiments, system 100 identifies the subset of content items based on comparing the received search input to the topics and dimensions stored in content item database 102*b*, or any other suitable aspect of content items stored in content item database 102*b*. For example, upon receiving the search input "Veganism Benefits," system 100 identifies content item 1, content item 2, and content item 3 as corresponding to the search input as each content item is stored in association with the dimension "Vegan" and a corresponding positive sentiment. In some embodiments, system 100 compares the user preferences (e.g., the plurality of dimensions and corresponding user sentiment and/or user sentiment intensity score) of the user profile associated with the user device the search input was received from (e.g., user device 104*a*, user device 104*b*) to the associated dimensions and corresponding sentiments and sentiment intensity scores of the plurality of content items stored in content item database 102*b* to determine a subset of content items that are relevant to and preferred by the user. In some implementations, system 100 identifies a first subset of content items based on comparing the received search input to the topics and dimensions stored in content item database 102*b* and then determines a second subset of relevant content items based on the user preferences. In some embodiments, system 100 identifies a first subset of relevant content items based on the user preferences and then determines a second subset of relevant content items based on comparing the received search input to the topics and dimensions stored in content item database 102*b*. In some implementations, content item database 102*b* is continuously filtered based on the user preferences stored in user database 106*a* to remove content items that do not match the user preferences of a user to create a sub-database of content items that are relevant to the user.

In some embodiments, system 100 stores user database 106*a* comprising data corresponding to the respective author preferences of the respective authors of the content items stored in content item database 102*b*, such as a set of dimensions, a respective author sentiment for each dimension, and a respective author sentiment intensity score for each dimension, as further discussed in regard to FIG. 1A. In some implementations, system 100 selects a subset of content items based on a comparison of the respective author preferences to the respective user preferences associated with the user profile associated with the user device the search request was received from. In some embodiments, system 100 selects content items based on the respective author preferences of the respective author matching the respective user preferences. For example, if the set of dimensions, the respective author sentiment for each dimension, and/or the respective author sentiment intensity score for each dimension matches the plurality of dimensions, the respective user sentiment for each dimension, and/or the respective user sentiment for each dimension over a threshold value, system 100 selects the content items authored by the respective author. It should be appreciated that system 100 may use any combination of methods to determine the subset of content items.

In some embodiments, subsequent to selecting a subset of content items that both correspond to the received search input and align with the user preferences of the user profile associated with the user device the search input was received from, system 100 determines a numerical score for each content item of the subset. In some implementations, system 100 ranks each content item based on comparing the search request (e.g., "Veganism Benefits") to the respective textual portion of each content item of the subset of content items to determine a respective relevance to the topic and/or the user. In some embodiments, a higher numerical score corresponds to a higher relevance and a lower numerical score corresponds to a lower relevance. In some implementations, system 100 calculates a numerical score for each content item based on comparing the search request (e.g., "Veganism Benefits") to the respective textual portion of each content item of the subset of content items to determine a respective relevance to the topic, prior to comparing the associated dimensions of the content items to the user preferences. In some embodiments, system 100 utilizes the numerical scores calculated for each content item to determine the subset of content items that are relevant to the search request (e.g., the request for data about a topic).

In some embodiments, subsequent to calculating the numerical score for each content item, system 100 generates a modified score for one or more of the content items based on comparing the associated dimensions of the content items to the user preferences. For example, if system 100 compares the dimensions and corresponding sentiments and sentiment intensity scores of a content item with an initial calculated numerical score of 77 and determines that $\frac{9}{10}$ of the dimensions perfectly align with the user preferences and $\frac{1}{10}$ semi-aligns with the user preferences, system 100 generates a modified numerical score for the content item of 94. In some embodiments, subsequent to generating a modified numerical score for each content item, a subset of content items is selected to be generated for display at the device of the user based on the modified numerical scores (e.g., system 100 selects the content items with the highest numerical scores to be provided to the user). For example, as shown in FIG. 1B, system 100 initially determines that each of content item 1, content item 2, and content item 3 matches the received search input and calculates a numerical score of 85 for content item 1, 75 for content item 2, and 90 for content item 3. Further, for example, upon comparing the associated dimensions of each of content items 1-3 to the user preferences stored in association with Dr. Hector, system 100 generates a modified numerical score of 90 for content item 1, 45 for content item 2, and 95 for content item 3. Further, for example, upon comparing the associated dimensions of each of content items 1-3 to the user preferences stored in association with Dr.

Maria, system 100 generates a modified numerical score of 40 for content item 1, 90 for content item 2, and 80 for content item 3.

In some implementations, subsequent to selecting the subset of content items that both correspond to the received search input and align with the user preferences of the user profile associated with the user device the search input was received from, system 100 modifies the textual portion of the content items based on comparing the user preferences (e.g., the dimensions and corresponding user sentiment and user sentiment intensity score) to the associated dimensions of each textual segment of each content item. In some embodiments, based on the comparison, system 100 removes all of, or a portion of, a textual segment. In some implementations, system 100 may utilize language processing to rewrite a portion of the textual portion of a content item based on the user preferences. For example, in some implementations, based on Dr. Hector having a positive sentiment and high sentiment intensity score (e.g., + +) for the dimension "Vegan," content item 1 having the associated dimension "Vegan" and a corresponding sentiment and sentiment intensity score that matches that of Dr. Hector (e.g., + +), and the search request "Veganism Benefits" corresponding to the dimension "Vegan" and a positive sentiment, system 100 selects Textual Segment 2 (e.g., "adherence to a vegan diet, rich in fruits, vegetables, whole grains, and nuts, was associated with a reduced risk of CHD" from FIG. 1A) and modifies it via removing a portion of the text (e.g., ", rich in fruits, vegetables, whole grains, and nuts,"), replacing "was" with "is," and expands "CHD" to "Coronary Heart Disease."

As shown in FIG. 1B, in some embodiments, system 100 generates for display user interface 114a on user device 104a (e.g., the device of Dr. Hector) and user interface 114b on user device 104b (e.g., the device of Dr. Maria). In some embodiments, user interface 114a comprises a reference to the search input (e.g., "Veganism Benefits"), a reference to content item 3, as modified by system 100, and a reference to content item 1, as modified by system 100. In some embodiments, the order of the presentation of content item 1 and content item 3 on user interface 114a is based on the modified numerical scores. In some implementations, user interface 114b comprises a reference to the search input (e.g., "Veganism Benefits") and a reference to content item 2, as modified by system 100. In some embodiments, user interface 114a and user interface 114b contain any number of suitable content items, based on any of the received search input, the associated dimensions of the content items, and the user preferences of the user profile associated with the user device the search input was received from. In some implementations, user interface 114a and user interface 114b include selectable option 116 corresponding to the modification details of the respective content items. In some implementations, system 100 generates for display (e.g., at user interface 114a or user interface 114b) the subset of selected content items without modifying the textual portion of the content items. In some embodiments, when system 100 generates for display the content items with unmodified textual portions (e.g., their original textual portions), selectable option 116 corresponds to the modification details of the numerical scores. Upon receiving a user input of selectable option 116, system 100 generates for display, at the user device (e.g., user device 104a or user device 104b) any of an indication of any modifications made to the content item, an indication of the reason for any modification made (whether to the numerical score or the textual portion), or selectable options corresponding to user approval or disapproval of the modification and/or the reasons for the modification, as further discussed in regards to FIGS. 1D-1E.

In some embodiments, system 100 determines the associated dimensions and corresponding sentiments and sentiment intensity scores for each content item after the subset of content items are selected. For example, in some embodiments, if the associated dimensions and corresponding sentiments and sentiment intensity scores for each content item are not stored in content item database 102b, system 100 selects a subset of content items that correspond to the received request for data about a topic (e.g., the received search request) and calculates a numerical score for each content item. Subsequently, in some embodiments, system 100 analyzes the selected subset of content items to determine the associated dimensions and corresponding sentiments and sentiment intensity scores for each content item. Subsequently, in some implementations, system 100 compares the extracted dimensions to the user preferences (e.g., the plurality of dimensions stored in association with the user profile associated with the user device the search request was received from) to modify any of the respective numerical scores of the content items or the respective textual portion of the content items.

Figure 1C:
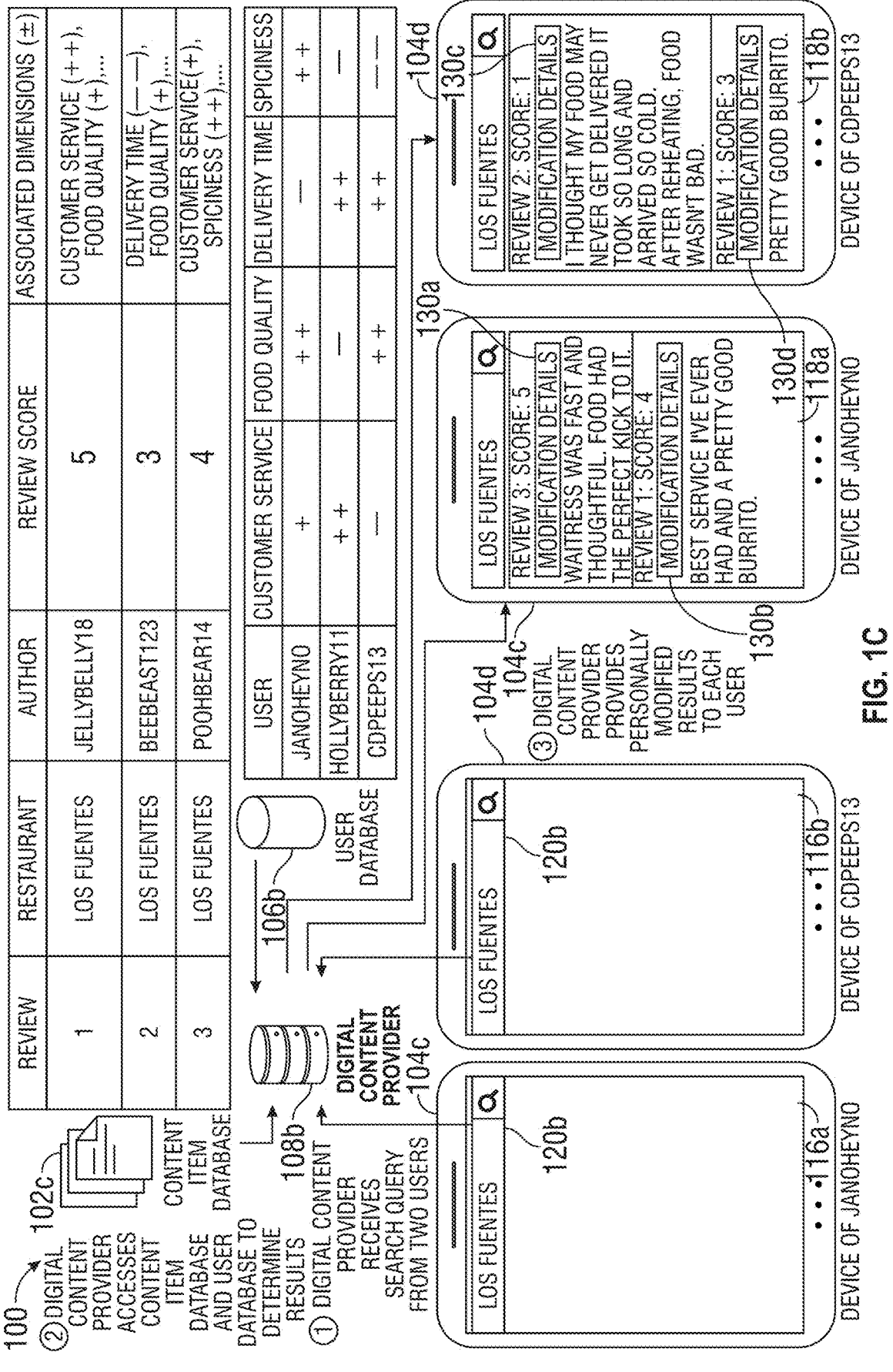
FIG. 1C depicts an illustrative system for providing a personalized selection of modified content items to a user device, in accordance with some embodiments of this disclosure.

As shown in FIG. 1C, in some embodiments, system 100 generates for display user interface 116a on user device 104c (e.g., the device of janoheyno) and user interface 116b on user device 104d (e.g., the device of cdpeeps13). In some embodiments, user device 104c is associated with the user profile janoheyno and user device 104d is associated with the user profile cdpeeps13. In some implementations, system 100 generates for display search bar 120b on user interface 116a and 116b. In some embodiments, system 100 receives the search input "Los Fuentes" (e.g., a restaurant) from both user device 104c and user device 104d. In some implementations, system 100 receives search input via any suitable method such as selection of user-selectable inputs (e.g., via selection of letters on a keyboard displayed on user interface 116a or 116b), a voice command, or any other suitable method or combination thereof. In some embodiments, system 100 receives the search input from user device 104c and user device 104d and transmits the search input to the servers of digital content provider 108b (e.g., an online catalog of restaurants).

In some implementations, the servers of digital content provider 108b, in response to receiving the search input "Los Fuentes," accesses content item database 102c and user database 106b. In some embodiments, content item database 102c is content item database 102a of FIG. 1A or content item database 102b of FIG. 1B. In some implementations, user database 106b is user database 106a of FIG. 1B. In some implementations, content item database 102c is a review database comprising a plurality of reviews published by respective user accounts, each review associated with a respective topic (e.g., a restaurant, product, business, etc.), a respective review score, and/or a respective textual portion. In some embodiments, content item database 102c comprises each of review 1, review 2, review 3, and a respective restaurant, a respective author, a respective review score, and respective associated dimensions and corresponding sentiments and/or sentiment intensity scores extracted from the respective textual portion of each review. For example, content item database 102c stores review 1, the restaurant of review 1 (e.g., Los Fuentes), the author of review 1 (e.g., jellybelly18), the associated dimensions of review 1 (e.g., Customer Service and Food Quality), and a sentiment and sentiment intensity score for each associated dimension (e.g., Customer Service (++), Food Quality (+)). It should be appreciated that the content item database 102c depicted in FIG. 1C is an illustrative example, and content item database 102c may store any number of reviews on any number of topics (e.g., restaurants, products, movies, etc.) and any type of suitable data corresponding to the reviews in any suitable matter. For example, in some implementations, content item database 102c independently stores each textual segment from the review, each associated dimension, sentiment, and/or sentiment intensity score, and any other suitable aspect of each review, such as date of publication, image data, associated products (e.g., food ordered at a restaurant), or other content items determined to be associated with the content item (e.g., restaurant profiles/websites, ecommerce websites, etc.). In some embodiments, the associated dimensions extracted from each review are stored in user database 106b in association with the user profile of the author of the respective review.

In some embodiments, system 100 stores user database 106b comprising a plurality of user preferences corresponding to a plurality of users. As shown in FIG. 1C, in some embodiments, user database 106b comprises data corresponding to the users janoheyno, hollyberry11, and cdpeeps13 and associated dimensions and corresponding sentiments and sentiment intensity scores for each user. For example, system 100 stores user database 106b comprising a user profile for janoheyno, a Customer Service sentiment and sentiment intensity score corresponding to janoheyno (e.g., +), a Food Quality sentiment and sentiment intensity score corresponding to janoheyno (e.g., + +), a Delivery Time sentiment and sentiment intensity score corresponding to janoheyno (e.g., –, and a Spiciness sentiment and sentiment intensity score corresponding to janoheyno (e.g., + +). It should be appreciated that the user database 106b depicted in FIG. 1C is an illustrative example, and user database 106b may store any number of users and/or user profiles and any type of suitable data corresponding to the users in any suitable matter. For example, in some implementations, system 100 stores user database 106b comprising a location of each user, a plurality of user profiles associated with each user (e.g., social media accounts), contact information of each user (phone number, email address, address), a plurality of purchases made by each user, and any other suitable information of each user. In some embodiments, system 100 mines the data stored in user database 106 from user activity across a plurality of applications, as further discussed in regard to FIG. 1B. For further discussion of data that may be stored in user database 106b, see FIG. 3.

In some implementations, the servers of digital content provider 108b identify a subset of content items from content item database 102c that correspond to the received search input (e.g., "Los Fuentes"). In some embodiments, system 100 identifies the subset of content items based on comparing the received search input to the topics and dimensions stored in content item database 102c, or any other suitable aspect of content items stored in content item database 102c. For example, upon receiving the search input "Los Fuentes," system 100 identifies review 1, review 2, and review 3 as corresponding to the search input as each content item is stored in association with the restaurant "Los Fuentes." In some embodiments, system 100 compares the user preferences (e.g., the plurality of dimensions and corresponding user sentiment and/or user sentiment intensity score) of the user profile associated with the user device the search input was received from (e.g., user device 104c, user device 104d) to the associated dimensions and corresponding sentiments and sentiment intensity scores of the plurality of content items stored in content item database 102c to determine a subset of content items that are relevant to and preferred by the user. In some implementations, system 100 identifies a first subset of content items based on comparing the received search input to the topics and dimensions stored in content item database 102c and then determines a second subset of relevant content items based on the user preferences. In some embodiments, system 100 identifies a first subset of relevant content items based on the user preferences and then determines a second subset of relevant content items based on comparing the received search input to the topics and dimensions stored in content item database 102c. In some implementations, content item database 102c is continuously filtered based on the user preferences stored in user database 106b to exclude content items (e.g., reviews) that do not match the user preferences of a user to create a sub-database of content items that are relevant to the user.

In some embodiments, subsequent to selecting a subset of content items that correspond to the received search input and/or align with the user preferences of the user profile associated with the user device the search input was received from, system 100 determines a numerical score for each content item of the subset (e.g., retrieves the review score stored in content item database 102c for each content item). In some implementations, system 100 generates a modified numerical score (e.g., review score) for one or more of the content items based on comparing the associated dimensions of the content items to the user preferences. In some embodiments, system 100 cleans the textual portion of each review (e.g., content item) to remove extraneous aspects of the text data, such as special characters or filler words that contain no meaning. In some implementations, system 100 utilizes any NER, ABSA, ML, NLP, text mining, or any other suitable textual analysis protocols to identify and categorize key phrases (e.g., textual segments of the textual portion of the review) related to different dimensions. In some embodiments, pre-trained language models such as BERT or GPT are used to extract relevant phrases (e.g., segment the textual portion into textual segments) and determine their respective sentiments, effectively categorizing the text into dimensions. In some embodiments, system 100 clusters the text into predefined dimensions. In some implementations, when predefined clusters are not available, system 100 utilizes an unsupervised learning approach to identify clusters within the review data.

In some embodiments, system 100 assigns scores to each dimension based on the extracted and clustered review points. In some implementations, system 100 normalizes the overall scores and uses sentiment analysis to map the extracted dimensions and corresponding sentiments to a 1-5 scale for each dimension. In some implementations, sentiment intensity is assessed using tools like VADER or custom-trained sentiment classifiers, and scores are assigned through linear mapping or machine learning regression models. In some implementations, system 100 filters reviews to display only the dimensions of interest corresponding to the user preferences of the user profile associated with the received search request. In some embodiments, system 100 assigns user-preferred dimensions as input and filters the reviews accordingly, and/or filters the textual portion of the reviews to generate a customized relevant summary corresponding to the user profile associated with the received search request. In some implementations, system 100 calculates personalized review scores for different dimensions and subsequently causes them to be displayed at the user device in place of or alongside the overall review score. In some implementations, system 100 generates the customized relevant summary by models such as BERT-based summarization techniques to ensure concise and relevant review content.

In some implementations, subsequent to selecting the subset of content items that correspond to the received search input and/or align with the user preferences of the user profile associated with the user device the search input was received from, system 100 modifies the textual portion of the content items based on comparing the user preferences (e.g., the dimensions and corresponding user sentiment and user sentiment intensity score) to the associated dimensions of each textual segment of each review (e.g., content item). In some embodiments, based on the comparison, system 100 removes all of, or a portion of, a textual segment. In some implementations, system 100 utilizes language processing to rewrite a portion of the textual portion of a content item based on the user preferences. For example, in some embodiments, based on janoheyno having a positive sentiment and high sentiment intensity score (e.g., + +) for the dimension "Spiciness"; review 3 having the associated dimension "Spiciness" and a corresponding sentiment and sentiment intensity score that matches that of janoheyno (e.g., + +); and the search request "Los Fuentes" corresponding to the restaurant (e.g., topic) of review 3, system 100 selects the textual segment "Food had the perfect kick to it" from the textual portion of review 3 to be included in the generated customized relevant summary corresponding to the user profile of janoheyno.

As shown in FIG. 1C, in some embodiments, system 100 generates for display user interface 118a on user device 104c (e.g., the device of janoheyno) and user interface 118b on user device 104d (e.g., the device of cdpeeps13). In some embodiments, user interface 118a comprises a reference to the search input (e.g., "Los Fuentes"), a reference to review 3 as modified by system 100, and a reference to review 1 as modified by system 100. In some embodiments, the order of the presentation of review 1 and review 3 on user interface 118a is based on the modified review scores and/or the comparison of the associated dimensions of the respective reviews to the user preferences of the user profile associated with the user device (e.g., janoheyno). In some implementations, user interface 118b comprises a reference to the search input (e.g., "Los Fuentes"), a reference to review 2, as modified by system 100, and a reference to review 1, as modified by system 100. In some embodiments, user interface 118a and user interface 118b contain any number of suitable reviews (e.g., content items), based on any of the received search input, the associated dimensions of the content items, or the user preferences of the user profile associated with the user device the search input was received from. In some implementations, user interface 118a includes selectable option 130a and selectable option 130b and user interface 118b includes selectable option 130c and selectable option 130d, each selectable option corresponding to the modification details of the respective reviews (e.g., content items). In some implementations, system 100 generates for display (e.g., at user interface 118a or user interface 118b) the subset of selected reviews (e.g., content items) without modifying the textual portion of the content items. In some embodiments, when system 100 generates for display the content items with unmodified textual portions (e.g., their original textual portions), selectable options 130a-130d correspond to the modification details of the review scores (e.g., numerical scores).

Figure 1D:
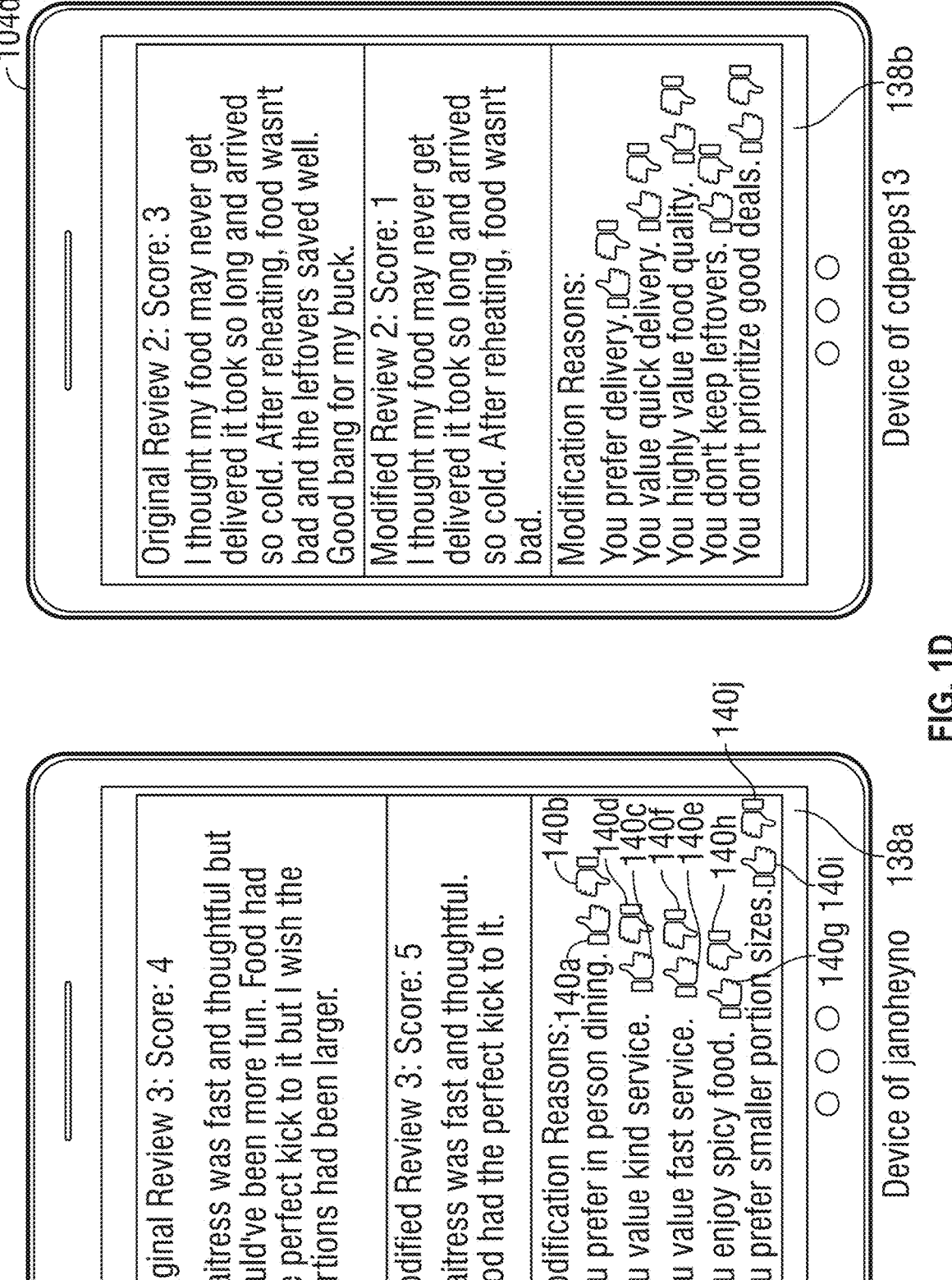
FIG. 1D depicts an illustrative system for providing content item modification details to a user device, in accordance with some embodiments of this disclosure.

As shown in FIG. 1D, in some embodiments, upon receiving a user input of selectable option 130a of FIG. 1C from user device 104c (e.g., the device of janoheyno), system 100 generates for display, at the user device (e.g., user device 104c), user interface 138a. In some implementations, upon receiving a user input of selectable option 130c of FIG. 1C from user device 104d (e.g., the device of cdpeeps13), system 100 generates for display, at the user device (e.g., user device 104d), user interface 138b. In some embodiments, system 100 generates for display on user interface 138a the original review (e.g., original review 3) comprising the original review score and/or the original textual portion, the modified review (e.g., modified review 3) comprising the modified review score and/or the modified textual portion, a summary of the reasons for modification of the review (e.g., "You prefer in-person dining," "You value kind service," etc.), and/or selectable options 140a-140j, corresponding to user approval (e.g., 140a, 140c, 140e, 140g, 140i) or user disapproval (e.g., 140b, 140d, 140f, 140h, 140j) of the modification and/or the reasons for the modification. In some implementations, upon receiving a selection of any of selectable options 140a-140j, system 100 updates the user database (e.g., user database 106a of FIG. 1B or user database 106b of FIG. 1C) to reflect the user approval or user disapproval of the reason for the modification. For example, in some embodiments, subsequent to receiving a user selection of selectable option 140h, corresponding to user disapproval of "You enjoy spicy food," at user device 104c, system 100 updates the dimension "Spiciness" within the user database to reflect that the user janoheyno does not enjoy spicy food. In some implementations, updating the dimension "Spiciness" comprises storing a new user sentiment and/or a new user sentiment intensity score that corresponds to not liking spiciness (e.g., – – or −0.8).

In some embodiments, system 100 generates for display on user interface 138b the original review (e.g., original review 2) comprising the original review score and/or the original textual portion, the modified review (e.g., modified review 2) comprising the modified review score and/or the modified textual portion, a summary of the reasons for modification of the review (e.g., "You prefer delivery," "You highly value food quality," etc.), and/or selectable options corresponding to user approval or user disapproval of the modification and/or the reasons for the modification. In some implementations, upon receiving a selection of any of the selectable options corresponding to user approval or user disapproval of the modification reasons, system 100 updates the user database (e.g., user database 106a of FIG. 1B or user database 106b of FIG. 1C) to reflect the user approval or user disapproval of the reason for the modification. For example, in some embodiments, subsequent to receiving a user selection of the selectable option corresponding to user disapproval of "You don't keep leftovers," at user device 104d, system 100 updates the dimension "Leftovers" within the user database to reflect that the user cdpeeps13 does keep leftovers. In some implementations, updating the dimension "Leftovers" comprises storing a new user sentiment and/or a new user sentiment intensity score that corresponds to liking leftovers (e.g., + or 0.9). It should be appreciated that user interface 138a and user interface 138b are illustrative examples, and system 100 may generate for display user interfaces 138a and 138b to indicate details regarding the modification of the respective content items (e.g., reviews) in any suitable manner. For example, in some embodiments, user interfaces 138a and 138b comprise any of an indication of the algorithm used to calculate the modified numerical scores (e.g., modified review scores), an indication of the determined dimensions and corresponding sentiments and sentiment intensity scores, an indication of the plurality of dimensions and corresponding user sentiments and user sentiment intensity scores as stored in the user database (e.g., user database 106*b* of FIG. 1C), a keyboard (or other input mechanism) to enable the user to specify feedback intended for system 100, or any other suitable display to provide transparency to the user regarding the modification of the reviews (e.g., content items) and to receive feedback regarding the modification.

In some embodiments, system 100 determines the reasons for modification based on the analysis of the associated dimensions, sentiments, and sentiment intensity scores of the content items. In some implementations, system 100 stores a history of dimension comparisons (e.g., content item dimensions compared to user preference dimensions), a match score for each dimension comparison (e.g., an indication of alignment between content item dimensions to user preference dimensions), an indication of the modification made based on each dimension comparison, and any other suitable data or combination thereof, in a modification database. In some embodiments, system 100 accesses the modification database and generates a modification summary based on the stored modification data. In some implementations, system 100 generates the modification summary by utilizing any of ML, LLM, NLP, or any other suitable method. In some embodiments, system 100 generates the modification summary as a complete summary of all modifications made (e.g., as in FIG. 1D and FIG. 1E). In some embodiments, system 100 generates a respective modification reason for each dimension indicated within the modification database as contributing to the modification of the content item. In some implementations, system 100 generates for display user interface 138*a*, user interface 138*b*, or any other suitable user interface, comprising a complete summary of all modifications made. In some embodiments, system 100 generates for display user interface 138*a*, user interface 138*b*, or any other suitable user interface, comprising each respective modification reason presented at a location based on the location of the corresponding modification. For example, in some embodiments, system 100 generates, for a particular content item, a new numerical score of 4 and removes the third textual segment of the particular content item. Further, for example, in some implementations, system 100 generates for display, in response to receiving an indication of a selection of a selectable option (e.g., selectable option 116 or 130*a*-130*d*), a user interface (e.g., user interfaces 138*a*, 138*b*, 148*a*, or 148*b*) comprising a respective numerical score modification summary aligned with the presentation of the new numerical score and a respective textual portion modification summary aligned with the third textual segment.

As shown in FIG. 1E, in some embodiments, upon receiving a user input of selectable option 130*b* from user device 104*c* (e.g., the device of janoheyno), system 100 generates for display, at the user device (e.g., user device 104*c*), user interface 148*a*. In some implementations, upon receiving a user input of selectable option 130*d* from user device 104*d* (e.g., the device of cdpeeps13), system 100 generates for display, at the user device (e.g., user device 104*d*), user interface 148*b*. In some embodiments, system 100 generates for display on user interface 148*a* the original review (e.g., original review 1) comprising the original review score and/or the original textual portion, the modified review comprising the modified review score and/or the modified textual portion, a summary of the reasons for modification of the review (e.g., "You prefer in-person dining," "You value good service," etc.), and/or selectable options 150*a*-150*h*, corresponding to user approval (e.g.,

150*a*, 150*c*, 150*e*, 150*g*) or user disapproval (e.g., 150*b*, 150*d*, 150*f*, 150*h*) of the modification and/or the reasons for the modification. In some implementations, upon receiving a selection of any of selectable options 150*a*-150*h*, system 100 updates the user database (e.g., user database 106*a* of FIG. 1B or user database 106*b* of FIG. 1C) to reflect the user approval or user disapproval of the reason for the modification. For example, in some embodiments, subsequent to receiving a user selection of selectable option 150*h*, corresponding to user disapproval of "You enjoy spicy food," at user device 104*c*, system 100 updates the dimension "Spiciness" within the user database to reflect that the user (e.g., janoheyno) does not enjoy spicy food. In some implementations, updating the dimension "Spiciness" comprises storing a new user sentiment and/or a new user sentiment intensity score that corresponds to not liking spiciness (e.g., – – or –0.6).

In some embodiments, system 100 generates for display on user interface 148*b* the original review (e.g., original review 1) comprising the original review score and/or the original textual portion, the modified review (e.g., modified review 1) comprising the modified review score and/or the modified textual portion, a summary of the reasons for modification of the review (e.g., "You don't place high value on customer service," "You highly value food quality," etc.), and selectable options corresponding to user approval or user disapproval of the modification and/or the reasons for the modification. In some implementations, upon receiving a selection of any of the selectable options corresponding to user approval or user disapproval of the modification reasons, system 100 updates the user database (e.g., user database 106*a* of FIG. 1B or user database 106*b* of FIG. 1C) to reflect the user approval or user disapproval of the reason for the modification. For example, in some embodiments, subsequent to receiving a user selection of the selectable option corresponding to user approval of "You prefer to order delivery," at user device 104*d*, system 100 updates the dimension "Delivery" within the user database to reflect that the user cdpeeps13 indeed does prefer delivery. In some implementations, updating the dimension "Delivery" comprises increasing the stored user sentiment and/or the user sentiment intensity score that corresponds to preferring delivery (e.g., + to ++ or 0.2 to 0.3). It should be appreciated that user interface 148*a* and user interface 148*b* are illustrative examples, and system 100 may generate for display user interfaces 148*a* and 148*b* to indicate details regarding the modification of the respective content items (e.g., reviews) in any suitable manner. For example, in some embodiments, user interfaces 148*a* and 148*b* comprise any of an indication of the algorithm used to calculate the modified numerical scores (e.g., modified review scores), an indication of the determined dimensions and corresponding sentiments and sentiment intensity scores, an indication of the plurality of dimensions and corresponding user sentiments and user sentiment intensity scores as stored in the user database (e.g., user database 106*b* of FIG. 1C), a keyboard (or other input mechanism) to enable the user to specify feedback intended for system 100, or any other suitable display to provide transparency to the user regarding the modification of the reviews (e.g., content items) and to enable system 100 to receive feedback regarding the modification.

As shown in FIG. 1C, in some embodiments, system 100 selects the same content item (e.g., review 1) to be generated for display at two user devices (e.g., user device 104*c* and 104*d*) but modifies the content item differently based on the respective dimensions of the content item and the user preferences associated with the user profile associated with the user device. For example, as shown in FIG. 1E, in some implementations, system 100 modifies the review score of review 1 to be 4 and generates a customized textual summary of "Best service I've ever had and a pretty good burrito" based on the stored user preferences corresponding to janoheyno (e.g., prefers in-person dining, values good service, etc.). In some implementations, system 100 modifies the review score of review 1 to be 3 and generates a customized textual summary of "Pretty good burrito" based on the stored user preferences corresponding to cdpeeps13 (e.g., doesn't place high value on customer service, highly values food quality, etc.).

In some embodiments, system 100 modifies the textual portion and/or the numerical score of content items based on inputs received from user profiles corresponding to a permission to modify content items. For example, in some implementations, system 100 accesses user device settings to determine if permission to modify the numerical score and/or the textual portion of content items has been granted by a user profile. In some embodiments, based on the determination that system 100 has permission to modify content items, system 100 proceeds with the methods disclosed herein. In some implementations, when system 100 determines that it does not have permission to modify content items, system 100 utilizes the disclosed methods to identify content items relevant to a user profile but refrains from modifying any aspects of the content items (e.g., the textual portion or numerical score) and subsequently generates for display the identified content items in their original form. In some embodiments, when system 100 determines that it only has permission to modify certain components of a content item (e.g., permission to modify numerical scores but not textual portions), system 100 performs the disclosed methods accordingly.

Figure 2A:
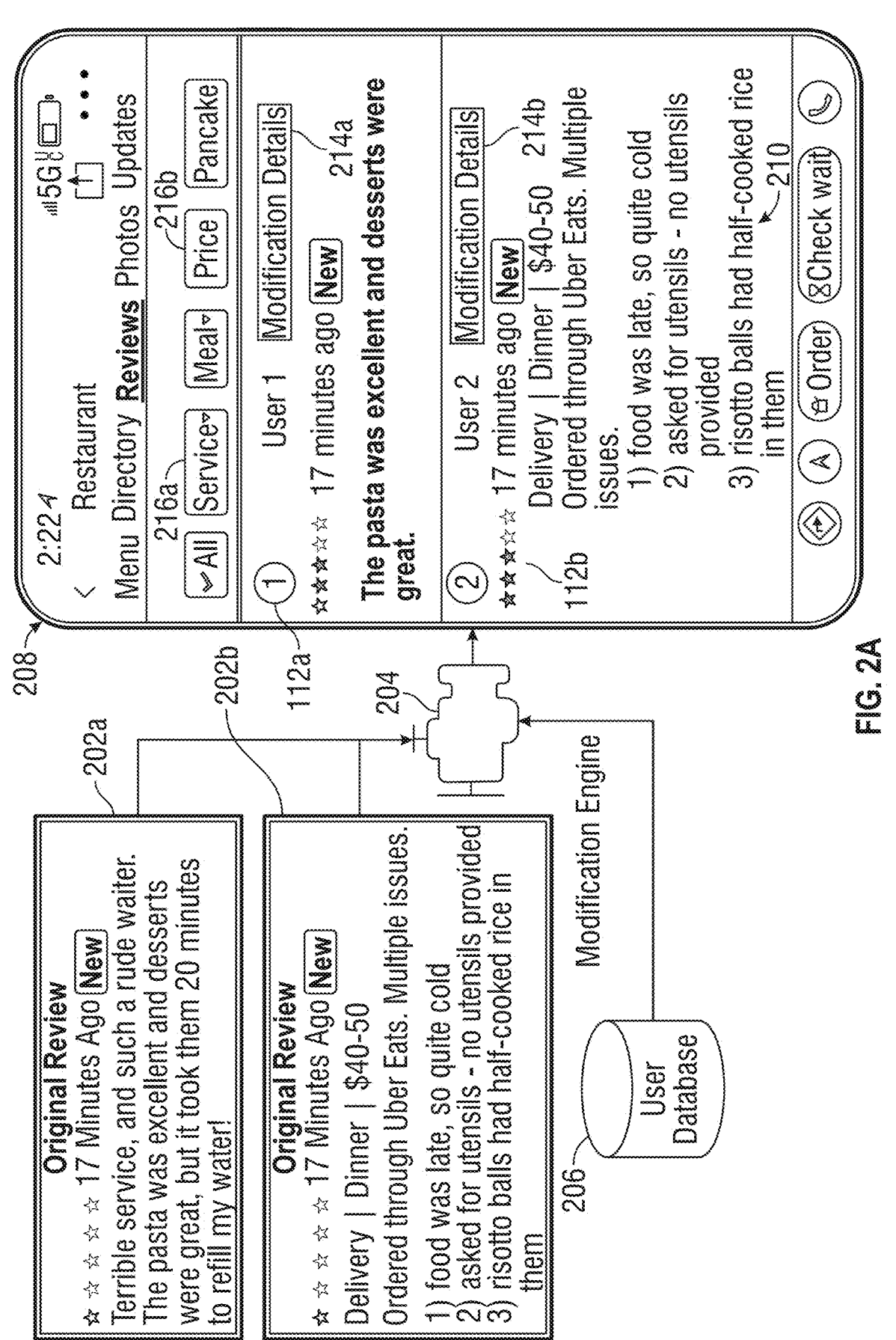
FIG. 2A depicts an illustrative system for providing a personalized selection of modified content items to a user device, in accordance with some embodiments of this disclosure.

In some embodiments, the system (e.g., system 100 from FIGS. 1A-1E) receives a request from a user device (e.g., user device 208 of FIG. 2A) to view reviews (e.g., content items) associated with a product, business, or any other suitable topic (e.g., restaurants, grocery stores, clothing, vacuum cleaners, movies, etc.). In some implementations, the system retrieves reviews from a database, retrieves user information (e.g., user preferences) from a user database, utilizes a modification engine to modify the reviews according to the retrieved user preferences, and generates for display the reviews at a device of a user. In some embodiments, each review (e.g., review 202a and review 202b of FIG. 2A) comprises a review score (e.g., numerical score), a textual portion, and an author. For example, as shown in FIG. 2A, in some embodiments, the system retrieves reviews 202a and 202b (e.g., from a content item database), utilizes modification engine 204 to modify the reviews according to user preferences retrieved from user database 206, and generates for display, at user device 208, user interface 210, including modified review 112a, modified review 112b, and selectable options 214a and 214b corresponding to the modification details of the respective reviews. In some implementations, user database 206 is user database 106a of FIG. 1B and/or user database 106b of FIG. 1C. In some embodiments, the system retrieves review 202a and review 202b. In some implementations, review 202a and review 202b are retrieved from a content item database (e.g., content item database 102a of FIG. 1A, content item database 102b of FIG. 1B, or content item database 102c of FIG. 1C). In some embodiments, review 202a and review 202b are authored by respective users (e.g., jellybelly18 or beebeast123 of FIG. 1C). For example, in some implementations, the system receives review 202a from a user device of the respective author and subsequently stores review 202a and the information of the respective author in the user database. In some embodiments, the information of the respective author includes author preferences, author account information, author tendencies (e.g., tends to give lower review scores, tends to order delivery, tends to review specific restaurant types, tends to review specific products, or any other suitable data), author contact information, author location information, or any other suitable data. In some embodiments, the information of the respective author is stored in user database 206.

In some implementations, the system (e.g., system 100 from FIGS. 1A-1E) simultaneously retrieves dimensions and corresponding sentiments and/or sentiment intensity scores with review 202a and 202b. In some embodiments, the dimensions and corresponding sentiments and/or sentiment intensity scores are stored in a database with the reviews (e.g., content item database 102a of FIG. 1A, content item database 102b of FIG. 1B, or content item database 102c of FIG. 1C). In some implementations, modification engine 204 analyzes the retrieved reviews (e.g., review 202a and review 202b) to determine associated dimensions and corresponding sentiments and/or sentiment intensity scores for each review. In some implementations, the system compares the dimensions and corresponding sentiments and/or sentiment intensity scores of the retrieved reviews (e.g., review 202a and 202b) to user dimensions and corresponding user sentiments and/or user sentiment intensity scores retrieved from user database 206. In some embodiments, the system modifies the retrieved scores (e.g., review 202a and 202b) based on the comparison of the dimensions (and corresponding scores) of the reviews to the user dimensions (and corresponding user scores).

In some implementations, the system (e.g., system 100 from FIGS. 1A-1E) retrieves user information from user database 206 corresponding to a user profile associated with the user device (e.g., user device 208) that the request to view reviews (e.g., content items) was received from. In some embodiments, the system retrieves a plurality of dimensions and corresponding user sentiments and user sentiment intensity scores. In some implementations, the system determines user preferences to be stored in user database 206 based on input, received at user devices associated with user profiles, indicating preferences as part of a dedicated calibration stage. In some embodiments, the system incrementally determines user preferences to be stored in user database 206 based on monitoring activity associated with the user profile (e.g., orders made, reviews published, time and location data corresponding to visits to businesses, content consumed, etc.). In some implementations, the system determines user preferences such as spiciness, vegetarian options, and cocktail selection. In some embodiments, the system associates an importance value with the user preferences to indicate how much a particular feature matters to a user. For example, in some embodiments, a user with a high spice tolerance has a slight preference (e.g., low importance, low user sentiment intensity score) for very spicy food (e.g., high intensity, high user sentiment), while a user with a low spice tolerance has a strong preference (e.g., high importance, high user sentiment intensity score) for non-spicy food (e.g., low intensity, low user sentiment).

In some embodiments, the system (e.g., system 100 from FIGS. 1A-1E) modifies the numerical score (e.g., review score) of each review. For example, in some implementations, the system retrieves the review score (e.g., numerical score) of each review (e.g., review 202*a* and 202*b*) from the content item database. It should be appreciated that in some embodiments, the system calculates the numerical score of each content item (e.g., scientific research paper, movie, TV show, news article, etc.). In some implementations, the system assigns a weight to each dimension associated with each review score based on the author preferences and/or analysis of the textual portion of the review. In some embodiments, the system determines a modified review score of a review based on the assigned weights of each dimension of the review, the review score, and/or the user preferences retrieved from user database 206. For example, as shown in FIG. 2A, in some implementations, the system (e.g., by modification engine 204) modifies the review score of review 202*a* from 1 star (e.g., ⅕, 20%) to 3 stars (e.g., ⅗, 60%). Further, for example, in some implementations, the system generates the modified review score of 3 stars for review 202*a* based on retrieved user preferences comprising the dimension "Service" and a corresponding user sentiment of 5 (e.g., on a 1-100 scale) and/or a user sentiment intensity score of 5.

In some implementations, the system (e.g., system 100 from FIGS. 1A-1E) modifies the textual portion of each review. In some embodiments, the system modifies only the textual portion of each review. In some implementations, the system optionally modifies the textual portion of the review in addition to the review score (e.g., numerical score) of the review. In some embodiments, the system modifies the textual portion of the review to make it more relevant to a user. In some embodiments, the system utilizes existing natural language processing (NLP) techniques to identify and remove irrelevant portions of a review, and large language models (LLMs) to rewrite and/or summarize reviews. For example, in some embodiments, as shown in FIG. 2A, the system modifies (e.g., by modification engine 204) the textual portion of review 202*a* (e.g., "Terrible service, and such a rude waiter. The pasta was excellent and desserts were great, but it took them 20 minutes to refill my water!") to be "The pasta was excellent and desserts were great."

In some implementations, the system segments the textual portion of a review into textual segments. In some embodiments, the system segments the textual portion of review 202*a* into textual segment 1 (e.g., "Terrible service, and such a rude waiter."), textual segment 2 (e.g., "The pasta was excellent and desserts were great"), and textual segment 3 (e.g., "it took them 20 minutes to refill my water!"). In some implementations, the system determines (e.g., by language analysis or by retrieving from the content item database) dimensions and corresponding sentiment and sentiment intensity scores for each textual segment. For example, in some implementations, the system determines that textual segment 1 has the dimension "Customer Service," determines a negative sentiment for textual segment 1 (e.g., the reviewer had a negative customer service experience), determines a high sentiment intensity score for textual segment 1 (e.g., the reviewer had an extremely negative experience), assigns a high score weight to textual segment 1 (e.g., textual segment 1 has the highest influence on the review score), and/or assigns a textual segment score of 0 (e.g., 0/5) to textual segment 1 (e.g., if the textual portion only consisted of textual segment 1, the review score would be 0). In some embodiments, the system compares one or more of the parameters of textual segment 1 (e.g., the dimension, the sentiment, the sentiment intensity score, the score weight, the textual segment score) to the user preferences retrieved from user database 206. For example, in some embodiments, the system compares the "Customer Service" dimension, the negative sentiment, and the high sentiment intensity score of textual segment 1 to the low user sentiment intensity score corresponding to "Customer Service" (e.g., the user does not care about customer service) retrieved from user database 206. In some implementations, the system generates a modified textual segment for review 202*a* by removing textual segment 1 from the textual portion based on the comparison of the parameters of textual segment 1 to the retrieved user preferences.

As shown in FIG. 2A, in some embodiments, the system (e.g., system 100 of FIGS. 1A-1E) generates for display, at a user device (e.g., user device 208), user interface 210 comprising the modified reviews (e.g., modified review 212*a* and modified review 212*b*), selectable options (e.g., selectable option 214*a* and selectable option 214*b*) corresponding to the modification of the respective modified reviews, and selectable parameters (e.g., selectable parameter 216*a* and selectable parameter 216*b*). In some embodiments, the system generates for display reasons for modification of the review (e.g., relevant user preferences and dimensions of the review) alongside the modified review to indicate the ways in which the review was modified. In some embodiments, the system generates for display different modified reviews and/or modifies reviews (e.g., content items) differently based on receiving an input corresponding to a selection of a selectable parameter. For example, in some embodiments, upon receiving an input corresponding to a selection of selectable parameter 216*a*, the system generates a modified textual portion for review 202*a* that includes textual segment 1 (e.g., "Terrible service, and such a rude waiter."). For example, in some embodiments, the system generates for display a different set of review ratings depending on whether the system has received an input corresponding to a selection of in-person dining in, picking up, or ordering delivery. Similarly, in some implementations, the system generates for display a new set of modified reviews based on receiving an input corresponding to an indication of interest in a particular dish and a determination that the reviews newly selected to be generated for display mention that dish.

In some embodiments, the system (e.g., system 100 of FIGS. 1A-1E) simultaneously generates for display an indication of the original, unmodified review score (e.g., 1 star for review 202*a*) and an indication of the modified review score (e.g., 3 stars for review 202*a*) at user interface 210. In some implementations, system 100 only generates for display the modified review score (e.g., 3 stars for review 202*b*) at user interface 210 but, in response to receiving an input corresponding to a selection of selectable option 214*b*, generates for display the original, unmodified review score, at a user interface (e.g., user interface 220 of FIG. 2B) of the user device (e.g., user device 208). In some implementations, the system generates for display the modified textual portion of a review (e.g., for modified review 112*a*) at user interface 210. In some embodiments, the system generates for display the unmodified textual portion of a review (e.g., for modified review 212*b*) at user interface 210.

In some embodiments, the system provides a user interface for the submission of reviews enabling dimensions, sentiments, sentiment intensities, and/or any other suitable specifications to be assigned to respective textual segments of the textual portion of the review and/or as respective influences on the review score. For example, in some implementations, the system provides a user interface enabling a respective textual portion to be specified for a respective dimension, a respective numerical score to be indicated corresponding to a respective dimension, and/or any other suitable method for identifying dimension, sentiments, and/or sentiment intensities. In some embodiments, the system stores received reviews comprising the specified textual segments, dimensions, sentiments, and/or sentiment intensities in the content item database (e.g., content item database 102a-102c of FIGS. 1A-1C, respectively).

As shown in FIG. 2B, in some embodiments, the system (e.g., system 100 of FIGS. 1A-1E) generates for display, at the user device (e.g., user device 208), user interface 218 comprising reviewer details 222, original review 224, user details 226, personalized review 228, and modification details 230. In some implementations, original review 224 is review 202a of FIG. 2A and personalized review 228 is modified review 212a of FIG. 2A. In some embodiments, the system generates for display, at the user device (e.g., user device 208), interface 220 comprising reviewer details 232, original review 234, user details 236, personalized review 238, and modification details 240. In some implementations, original review 234 is review 202b of FIG. 2A and personalized review 238 is modified review 212b of FIG. 2A. In some embodiments, the system retrieves reviewer details 222 and reviewer details 232 from user database 206. In some implementations, the system determines a user profile associated with the original review 224 (e.g., the user profile associated with the author of original review 224, as stored in the content item database) and accesses the user information corresponding to the determined user profile that is stored in user database 206. In some embodiments, when the content item database comprises author information, the system retrieves reviewer details 222 from the content item database. In some implementations, the system determines a user profile associated with the original review 234 (e.g., the user profile associated with the author of original review 234, as stored in the content item database) and accesses the user information corresponding to the determined user profile that is stored in user database 206. In some embodiments, when the content item database comprises author information, the system retrieves reviewer details 232 from the content item database.

In some implementations, the system (e.g., system 100 of FIGS. 1A-1E) retrieves user details 226 and user details 236 from user database 206. In some implementations, the system determines a user profile associated with the user device from which the request to view the modification details (e.g., the selection of selectable option 214a or selectable option 214b) was received and accesses the user information corresponding to the determined user profile that is stored in user database 206. In some embodiments, reviewer details 222, user details 226, reviewer details 232, and user details 236 comprise details (e.g., user preferences, dimensions and corresponding sentiments and sentiment intensity scores) utilized by the system to modify the respective reviews. In some embodiments, the system generates for display modification details 230 comprising a summary (e.g., generated by ML, LLM or any other suitable method) of the modifications made (e.g., increased score from 1 to 3, removed content related to in-person dining experience) and the rationale for the respective modification (e.g., expected delivery experience, you are ordering delivery). In some embodiments, the system generates for display modification details 240 comprising a summary (e.g., generated by ML, LLM or any other suitable method) of the modifications made (e.g., increased score from 1 to 3, downgraded) and the rationale for the respective modification (e.g., you live 0.5 miles away; reviewer lives 10 miles away, you ordered utensils 1/95 times). In some embodiments, the system generates a single summary of all modification reasons. In some implementations, the system generates a summary of modification reasons for modifications made to the review score (e.g., numerical score) and a summary of modification reasons for modifications made to the textual portion, such as in user interface 218 and the corresponding modification details 230. In some embodiments, the system generates a summary of modification reasons for each modification made to the original review, such as in user interface 220 and the corresponding modification details 240. In some implementations, the system generates for display modification details 230 and/or modification details 240 comprising any indication of the modifications made, the rationale (e.g., reasons) for the modifications, the information utilized by the system to determine what modifications to make (e.g., stored user preferences, determined dimensions and corresponding sentiments and sentiment intensity scores), the impact of each textual segment on the modification decision, or any other information to provide transparency to the user regarding the modifications. It should be appreciated that while FIGS. 2A-2B are illustrative examples corresponding to restaurant reviews, the disclosed methods may be applied to any reviewed product or service.

In some embodiments, the system (e.g., system 100 of FIGS. 1A-1E) retrieves user features (e.g., address) and identifies preferences by monitoring and analyzing user account activity (e.g., placement of orders, submission of reviews). In some implementations, the system detects mentioned product features (e.g., delivery speed, food quality, spice level) for each review. In some embodiments, the system splits detected product features into two categories: user profile features and preference-related features. In some embodiments, the system identifies similarities between reviewer profile features and user profile features. In some implementations, the system identifies sentiment and intensity of product features identified within a submitted review (e.g., "delivery took hours and food arrived cold" equates to a negative sentiment and high intensity for delivery time). In some embodiments, the system determines sentiment and intensity ratings based on similarities between user profile features and reviewer profile features. In some implementations, the system identifies intensity associated with each user preference-related feature (e.g., "So spicy I couldn't finish" equates to a high intensity). In some embodiments, for each feature, the system determines a preferred user intensity based on order and review history. In some implementations, the system weights each detected user preference-related feature based on a determined similarity between user preference and the determined feature intensity of the review. In some embodiments, the system calculates a new review score based on the newly weighted product features and generates for display the updated review score at a user device (e.g., user devices 104a, 104b, 104c, or 104d of FIGS. 1A-1E or user device 208 of FIGS. 2A-2B).

As shown in FIG. 3, in some embodiments, the system (e.g., system 100 of FIGS. 1A-1E) stores information corresponding to the user profile and user preferences in a user database (e.g., user database 106a or 106b of FIGS. 1A-1E or user database 206 of FIG. 2A). For example, in some implementations, the system stores user profile information 302 comprising objective, factual data about the user (e.g., address, order history, user account activity, age, gender, etc.) derived from any of input received from a user device (e.g., user devices 104a-104d of FIGS. 1A-1E or user device 208 of FIGS. 2A-2B), monitoring of the user account, or any other suitable method. In some embodiments, the system utilizes user profile information 302 to predict upcoming order parameters (e.g., the likelihood of ordering takeout, the likelihood of ordering delivery, the likelihood of ordering a particular dish, etc.). In some implementations, the system utilizes user profile information 302 to determine profile-related product features (e.g., estimated delivery speed based on restaurant location and user address). In some embodiments, the system retrieves auxiliary information (e.g., business location, reported delivery times, etc.) from third-party sources (e.g., publicly available websites) or from the system's business database.

In some implementations, the system (e.g., system 100 of FIGS. 1A-1E) stores user preferences 304 comprising subjective opinions of product features derived from user profile activity (e.g., placement of orders, submission of reviews, upvoting or downvoting of reviews submitted by other users, or any other suitable user profile activity). In some embodiments, the system associates user preferences 304 with a determined intensity (e.g., prefers food that is not spicy, prefers food that is extremely spicy). In some embodiments, the system associates user preferences 304 with a determined importance (e.g., the user has a mild preference for spicy food, the user cannot tolerate spicy foods). In some implementations, the system compares user preferences 304 (e.g., the user does not like spicy food) to preference-related product features derived from reviews submitted by other users (e.g., the food of the restaurant reviews being displayed at the user device is always spicy). In some embodiments, the system utilizes user profile information 302 and user preferences 304 to modify reviews (e.g., modify the review score, modify the textual portion of the review).

In some embodiments, the system (e.g., system 100 of FIGS. 1A-1E) retrieves user features (e.g., address) and identifies preferences from past reviews and orders. In some implementations, for each review, the system detects mentioned product features (e.g., delivery speed, food quality, spice level), splits the detected product features into two categories: user profile-related features and preference-related features. In some embodiments, for user profile-related features, the system identifies similarities between reviewer and user profile features, identifies a sentiment and an intensity of product features identified by reviewer (e.g., "delivery took hours and food arrived cold"=negative sentiment and high intensity for delivery time), and weights the feature sentiment and intensity ratings based on the identified similarities between the user and reviewer profile features. In some embodiments, for user preference-related features, the system identifies an intensity associated with each (e.g., "So spicy I couldn't finish"=high intensity), determines a preferred user intensity based on order and review history for each feature, weights each detected user preference-related feature based on similarities between user preference and the review's feature intensity, calculates a new review score based on newly weighted product features, and presents the updated review score to the user.

In some implementations, the system (e.g., system 100 of FIGS. 1A-1E) receives input from a user device (e.g., user devices 104a-104d of FIGS. 1A-1E or user device 208 of FIGS. 2A-2B) corresponding to features of interest or relevant order details. In some embodiments, the system determines a new set of modified or unmodified reviews (e.g., content items) to be generated for display, updates the modification of reviews, or otherwise updates the user interface being generated for display based on the received input corresponding to features of interest or relevant order details. For example, in some implementations, the system generates for display a different set of review ratings based on receiving input corresponding to an interest in dining in, picking up, or ordering delivery. Similarly, in some implementations, the system receives input corresponding to a particular dish of interest and subsequently generates for display a new set of reviews based on determining that each review in the new set of reviews mentions the particular dish.

Figure 4A:
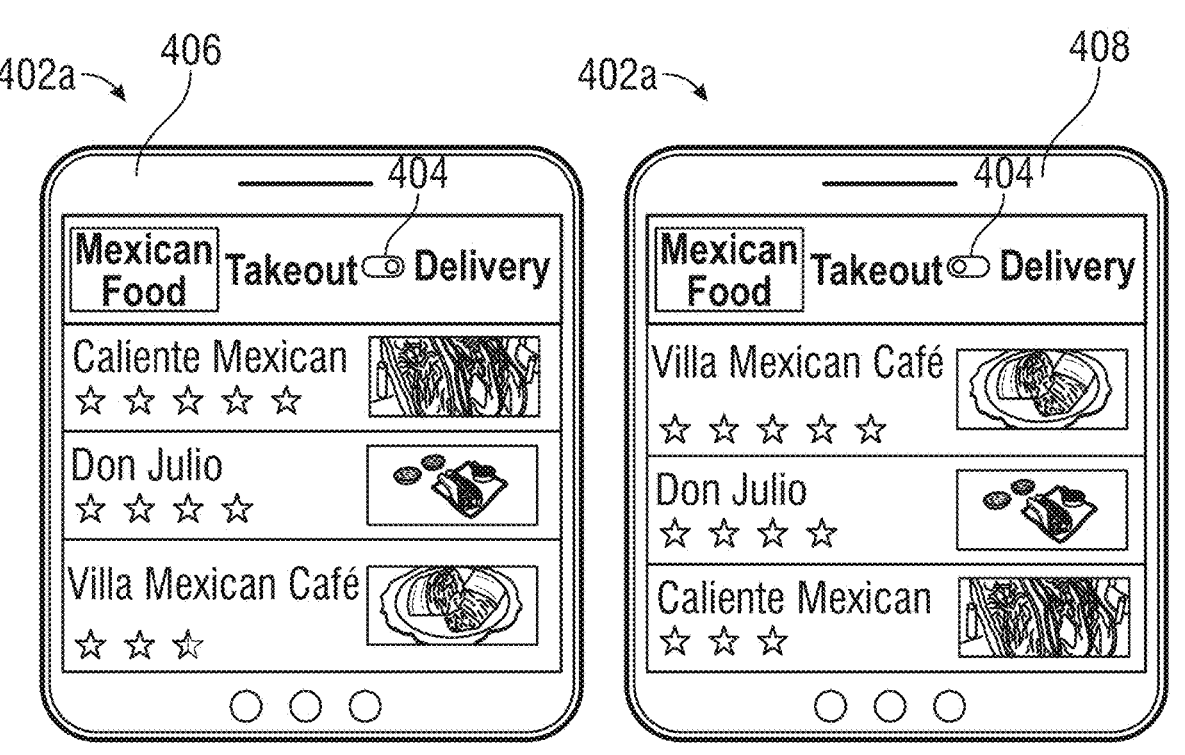
FIG. 4A depicts an illustrative example of personalized selections of content items based on parameters, in accordance with some embodiments of this disclosure.

As shown in FIG. 4A, in some implementations, the system (e.g., system 100 of FIGS. 1A-1E) generates for display, at user device 402a, first result set 406 comprising three restaurants listed in the order of Caliente Mexican, Don Julio, and Villa Mexican Café when toggle 404 is set to "Delivery." In some embodiments, user device 402a is user devices 104a-104d of FIGS. 1A-1E or user device 208 of FIGS. 2A-2B. In some embodiments, the system generates for display, at user device 404, second result set 408 comprising the same three restaurants in a second listed order of Villa Mexican Café, Don Julio, and Caliente Mexican when toggle 404 is set to "Takeout." In some embodiments, the system analyzes the reviews corresponding to each respective restaurant, analyzes the stored dimensions and associated weights and scores of the reviews of each respective restaurant, and/or calculates a respective "Delivery" rating and "Takeout" rating based on the reviews associated with each respective restaurant. In some implementations, the system changes the listed order of the restaurants (e.g., content items) and/or modifies the presented rating of each restaurant based on the status of toggle 404 (e.g., set to "Delivery" or "Takeout"). In some embodiments, the system calculates and stores a plurality of respective ratings for content items (e.g., restaurant profiles, store profiles, product profiles) corresponding to a plurality of parameters (e.g., takeout, delivery, dine-in, particular meal, particular dish, particular product, or any other suitable parameter) in a content item database (e.g., content item database 102a of FIG. 1A, content item database 102b of FIG. 1B, or content item database 102c of FIG. 1C) and consequently retrieves the respective rating for each content item based on received input. In some embodiments, the system retrieves the respective "Delivery" rating or "Takeout" rating from a content item database and generates for display the respective parameter rating of each content item. For example, in some implementations, the system generates for display a rating of 4.5 stars for Caliente Mexican when toggle 404 is set to "Delivery" but generates for display rating of 3 stars for Caliente Mexican when toggle 404 is set to "Takeout."

In some embodiments, the system (e.g., system 100 of FIGS. 1A-1E) aggregates relevant reviews on one or more specific aspects of a product or service (e.g., a specific dish at a restaurant) to generate for display personalized reviews that offer more granularity. In some implementations, the system generates for display relevant recommendations and reviews, instead of multiple recommendations and a vast number of reviews, enabling quick identification of the most relevant and useful reviews and an indication if a specific product or service is likely to be a good experience or unlikely to be a bad experience. In some embodiments, the system receives a request for restaurant recommendations from a user device (e.g., 104a-104d of FIGS. 1A-1E, user device 208 of FIGS. 2A-2B, user device 402a) and determines a set of recommended restaurants (e.g., content items) based on any of ratings, proximity to the user device, past user account activity (e.g., past orders, past visits, past reviews), or any other suitable parameters. In some implementations, in response to receiving an input from the user device corresponding to in-person dining and spaghetti, the system searches for reviews associated with each restaurant of the set of recommended restaurants that mention spaghetti in their respective textual portions and/or contain associated photos (e.g., of spaghetti). In some implementations, the system analyzes and identifies positive, negative, neutral reviews and creates an aggregated and ranked review of the dish (e.g., spaghetti) from each restaurant. In some embodiments, the system generates for display a personalized set of recommendations (e.g., restaurants, movies, articles, etc.) that is less dependent on the overall scores (e.g., ratings) of the content items by utilizing the analysis of secondary content (e.g., reviews) in view of the specific parameter (e.g., the specific dish).

In some embodiments, for each content item (e.g., restaurant profile, movie, etc.), the system (e.g., system 100 of FIGS. 1A-1E) generates for display the parameter (e.g., spaghetti, scary, New York, etc.) specific content comprising features such as ratings, likelihood of good quality, likelihood of bad quality, and/or relevant photos (e.g., photos submitted by reviewing users, photos submitted by the owner of the content item), thereby providing an accurate representation of the specific content the user is interested in. In some embodiments, the system utilizes additional information (e.g., publication date of reviews, author/reviewer profiles, user interactions with the content, etc.) in determining recommendations and/or ratings. For example, in some embodiments, the system determines a date corresponding to a change in a content item (e.g. a business comes under new management, a glitch in a website is fixed, a missing portion of a video is supplied) and disregards secondary content (e.g., reviews) having a publication date prior to the determined date of change. Further, for example, in some embodiments, the system weights content based on a determined accuracy (e.g., a review that has been liked by a large number of users is determined to have greater validity).

In some embodiments, the system (e.g., system 100 of FIGS. 1A-1E) predicts, based on current user device location, user address, and/or order history, whether delivery, takeout, or dining at a particular restaurant is most relevant to a user profile. In some implementations, the system calculates weights for user profile features and preferences based on prior reviews. For example, the system may identify delivery time as a feature associated with bad reviewer sentiment, but if the user has indicated they do not care about delivery time, such a feature would influence the personalized review score less than if the user indicated that delivery time was important to them.

Figure 4B:
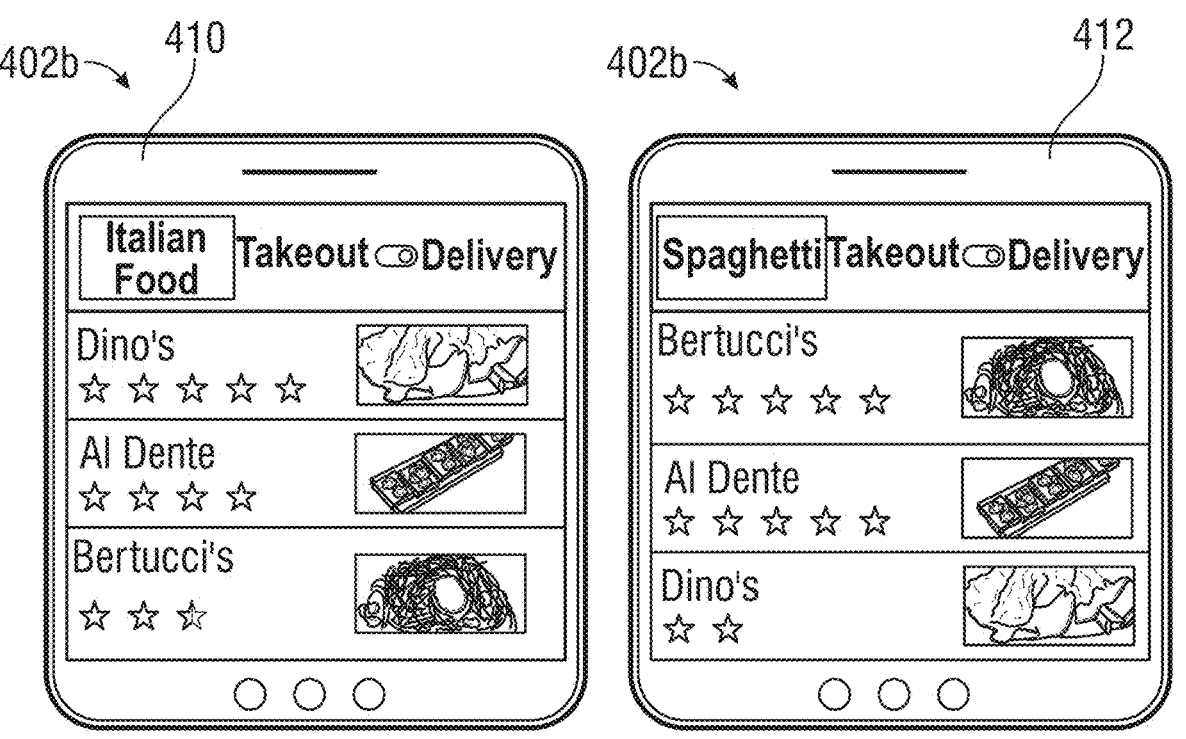
FIG. 4B depicts an illustrative example of personalized selections of content items based on parameters, in accordance with some embodiments of this disclosure.

As shown in FIG. 4B, in some implementations, the system (e.g., system 100 of FIGS. 1A-1E) generates for display, at user device 402*b*, result set 410 comprising the restaurants Dino's, Al Dente, and Bertucci's (e.g., restaurants serving Italian food) in response to receiving the search input "Italian Food." In some embodiments, the system identifies and ranks the restaurants comprising result set 410 and generates result set 410 based on the ranking. In some embodiments, the system identifies a relevant photo to be displayed with each restaurant in result set 410 based on any of an analysis of reviews, input received by a device of the owners of the respective restaurant, or any other suitable method. In some implementations, the system identifies a score to be displayed with each restaurant in result set 410 based on an analysis of all reviews (e.g., by disregarding ratings with associated with takeout instead of delivery, by disregarding ratings with a publication date prior to a determined date of change, etc.). For example, in some embodiments, the system identifies a photo of spaghetti to be displayed in association with Bertucci's and calculates or retrieves a review score of 2.5 stars for Bertucci's. In some embodiments, the system generates for display, at user device 402*b*, result set 412 comprising the restaurants Bertucci's, Al Dente, and Dino's in response to receiving the search input "Spaghetti." In some embodiments, the system identifies and ranks the restaurants comprising result set 412 and generates result set 412 based on the ranking. In some implementations, the system identifies a score to be displayed with each restaurant in result set 410 based on an analysis of reviews containing the specified search input (e.g., spaghetti). For example, in some embodiments, the system identifies Bertucci's as a restaurant that provides spaghetti and calculates a review score of 5 stars for Bertucci's based on an analysis of reviews that reference spaghetti in some way (e.g., in the textual portion, in a photo).

Figure 5:
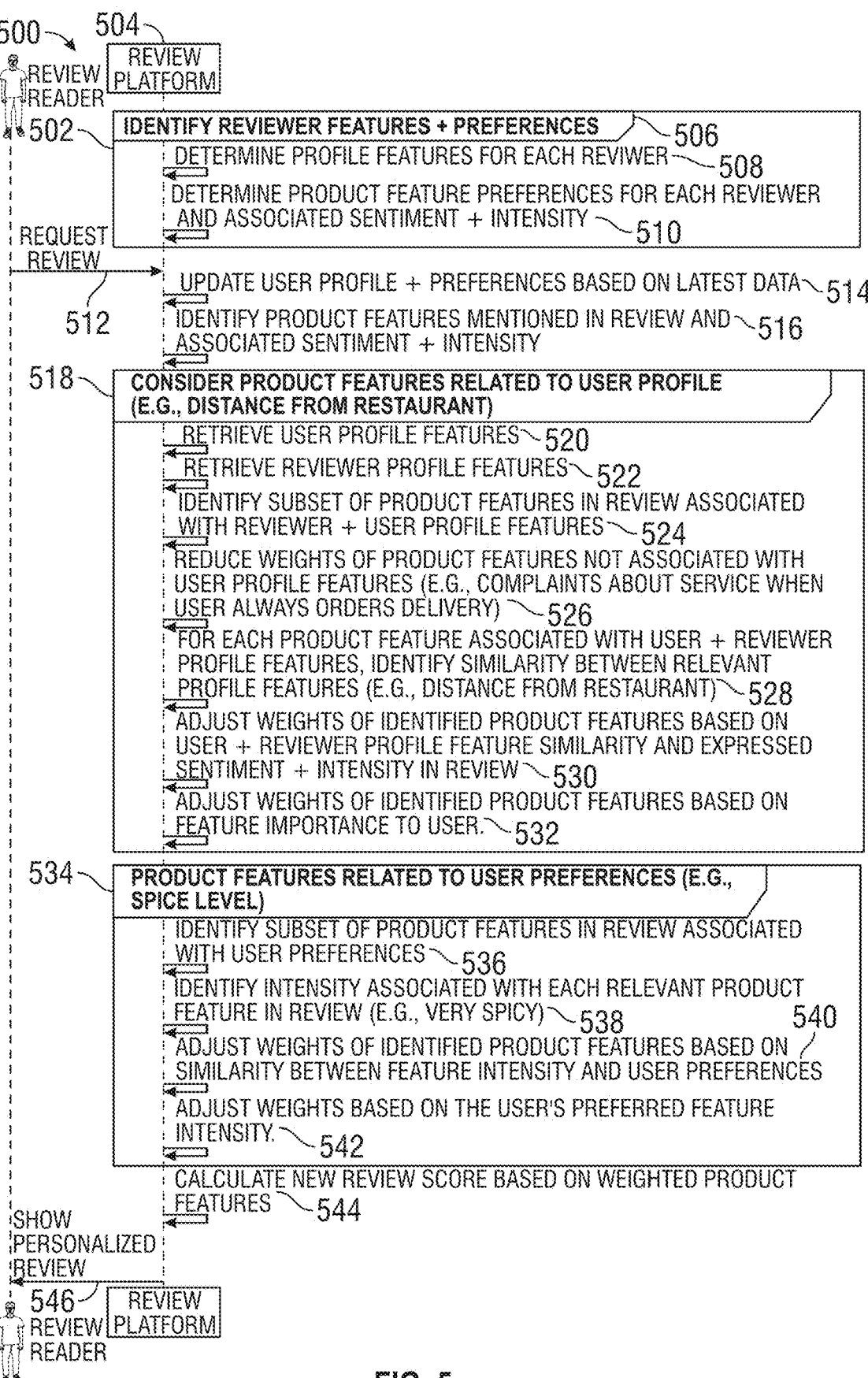
FIG. 5 is a sequence diagram of providing a personalized, modified review to a user device, in accordance with some embodiments of this disclosure.

FIG. 5 depicts process 500 comprising review reader 502 and review platform 504, in accordance with some embodiments of this disclosure. Process 500 may be implemented at least in part by, for example, system 100 of FIGS. 1A-1E. In some implementations, review platform 504 is digital content provider 108*a* or digital content provider 108*b* of FIGS. 1B and 1C, respectively. In some embodiments, review reader 502 is the user of user device 104*a* from FIG. 1B (e.g., Dr. Hector), the user of user device 104*b* from FIG. 1B (e.g., Dr. Maria), the user of user device 104*c* from FIG. 1C (e.g., janoheyno), the user of user device 104*d* from FIG. 1C (e.g., cdpeeps13), the user of user device 208 from FIG. 2A, or the user of user devices 402*a* and 402*b* from FIGS. 4A and 4B, respectively. In some implementations, at 506, review platform 504 identifies review features and preferences (e.g., user profile information 302 and user preferences 304 of FIG. 3). In some embodiments, at 508, review platform 504 determines profile features for each review, and, at 510, review platform 504 determines product feature preferences for each reviewer (e.g., author of each review) and associated sentiment and intensity. In some implementations, at 512, review platform 504 receives a request for a review from review reader 502. In some embodiments, at 514, review platform 504 updates user profile information and user preferences and stores the updated user profile information and user preferences in the user database (e.g., user databases 106*a* and 106*b* of FIGS. 1B and 1C, respectively, or user database 206 of FIG. 2A). In some implementations, at 516, review platform 504 identifies or retrieves (e.g., from the content item database) product features mentioned in the requested review and the corresponding sentiment and intensity.

In some implementations, at 518, review platform 504 considers product features related to the user profile (e.g., user profile information 302 of FIG. 3) of review reader 502 (e.g., distance from the restaurant of the requested reviews). In some embodiments, at 520, review platform 504 retrieves user (e.g., review reader 502) profile features (e.g., from the user database). In some implementations, at 522, review platform 504 retrieves reviewer (e.g., author of the requested review) profile features (e.g., from the user database). In some embodiments, at 524, review platform 504 identifies a subset of product features in the review that are associated with both the reviewer and the user profile features. In some implementations, at 526, review platform 504 reduces the weights of product features that are not associated with user profile features (e.g., complaints about service when the user always orders delivery). In some embodiments, at 528, review platform 504, for each product feature associated with both the user profile features and the reviewer profile features, identifies similarities between the relevant profile features (e.g., distance from restaurant). In some implementations, at 530, review platform 504 adjusts the weights of the identified product features based on the similarities between the user profile features and reviewer profile features and the expressed sentiment and intensity in the review. In some embodiments, at 532, review platform 504 adjusts the weights of the identified product features based on the importance of the feature to the user (e.g., review reader 502).

In some implementations, at 534, review platform 504 considers product features related to user preferences (e.g., user preferences 304 of FIG. 3) of review reader 502 (e.g., spice level). In some embodiments, at 536, review platform 504 identifies a subset of product features in the review that are associated with the user preferences (e.g., as retrieved from the user database). In some implementations, at 538, review platform 504 identifies or retrieves (e.g., from the content item database) the intensity associated with each relevant product feature in the review (e.g., very spicy). In some embodiments, at 540, review platform 504 adjusts the weights of the identified product features based on a determined similarity between the feature intensity and the user preferences. In some implementations, at 542, review platform 504 adjusts the weights of the identified product features based on the preferred feature intensity of the user. In some embodiments, at 544, review platform 504 calculates a new review score based on the weighted product features. review platform 504 generates a modified textual portion of the review based on the weighted product features. In some implementations, at 546, review platform 504 generates for display, at a user device of review reader 502, the personalized review (e.g., with the new review score and/or with the modified textual portion).

FIG. 6 shows generalized embodiments of illustrative user equipment devices 600 and 601. For example, user equipment device 600 may be a smartphone device (e.g., user devices 104a-104d of FIGS. 1A-1E). In another example, user equipment system 601 may be a user television equipment system. User television equipment system 601 may include set-top box 616. Set-top box 616 may be communicatively connected to microphone 618, speaker 614, and display 612. In some embodiments, microphone 618 may receive voice commands for a media or communication application. In some embodiments, display 612 may be a television display or a computer display. In some embodiments, set-top box 616 may be communicatively connected to user input interface 610. In some embodiments, user input interface 610 may be a remote control device or a touchscreen. Set-top box 616 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 7. Each one of user equipment device 600 and user equipment system 601 may receive content and data via input/output (I/O) path 602. In some embodiments, I/O path 602 is I/O circuitry. I/O path 602 may provide content (e.g., messages, calls, broadcast programming, on-demand programming, Internet content, content available over a local area network (LAN) or wide area network (WAN), and/or other content) and data to control circuitry 604, which includes processing circuitry 606 and storage 608. Storage 608 comprises the instructions for providing a personalized selection of modified content items to a user device as described in FIGS. 1A-5, when executed by processing circuitry 606. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions stored in memory (e.g., storage 608) for providing a personalized selection of modified content items to a user device as described in FIGS. 1A-5. Specifically, control circuitry 604 may perform the functions discussed above and below. In some implementations, any action performed by control circuitry 604 may be based on instructions received from the digital content provider (e.g., digital content provider 108a or 108b of FIGS. 1B and 1C, respectively or review platform 504 of FIG. 5).

In client/server-based embodiments, control circuitry 604 may include communications circuitry suitable for communicating with a communications application server or other networks or servers. The instructions for carrying out the above-mentioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user equipment devices, communication between a user and a contact of the user, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as the content item database (e.g., content item database 102a-102c of FIGS. 1A-1C, respectively) and the user database (e.g., user database 106a or 106b of FIGS. 1B and 1C, respectively or user database 206 of FIG. 2A) as data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment 600. Circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment system 601. For example, display 612 may be a touchscreen or touch-sensitive display. In such circumstances, user input interface 610 may be integrated with or combined with display 612. Display 612 may be one or more of a monitor, a television, a display for a mobile device, or any other type of display. A video card or graphics card may generate the output to display 612. The video card may be any processing circuitry described above in relation to control circuitry 604. The video card may be integrated with the control circuitry 604. Speakers 614 may be provided as integrated with other elements of each one of user equipment device 600 and user equipment system 601 or may be stand-alone units. The audio component of videos and other content displayed on display 612 may be played through the speakers 614. In some embodiments, the audio may be distributed to a receiver (not shown), which processes and outputs the audio via speakers 614.

The system for providing a personalized selection of modified content items to a user device as described in FIGS. 1A-5 may be implemented using any suitable architecture. For example, it may be a stand-alone system wholly-implemented on each one of user equipment device 600 and user equipment system 601. In such an approach, instructions of the system are stored locally (e.g., in storage 608), and data for use by the system is downloaded on a periodic basis (e.g., from an out-of-band feed, from an Internet resource, or using another suitable approach). Control circuitry 604 may retrieve instructions for the system from storage 608 and process the instructions to perform the management of a change in the contact information of a user. Based on the processed instructions, control circuitry 604 may determine what action to perform when input is received from user input interface 610. For example, movement of a cursor on a display up/down may be indicated by the processed instructions when user input interface 610 indicates that an up/down button was selected.

In some embodiments, the system for providing a personalized selection of modified content items to a user device is a client/server-based application. Data for use by a thick or thin client implemented on each one of user equipment device 600 and user equipment system 601 is retrieved on-demand by issuing requests to a server remote to each one of user equipment device 600 and user equipment system 601. In one example of a client/server-based guidance application, control circuitry 604 runs a web browser that interprets web pages provided by a remote server. For example, the remote server may store the instructions for the content-providing application (e.g., Yelp) in a storage device. The remote server may process the stored instructions using circuitry (e.g., control circuitry 604) to perform the operations discussed in connection with FIGS. 1A-5 and 8.

In some embodiments, the system for providing a personalized selection of modified content items to a user device may be downloaded and interpreted or otherwise run by an interpreter or virtual machine (run by control circuitry 604). In some embodiments, the system for providing a personalized selection of modified content items to a user device may be encoded in the ETV Binary Interchange Format (EBIF), received by the control circuitry 604 as part of a suitable feed, and interpreted by a user agent running on control circuitry 604. For example, the system for providing a personalized selection of modified content items to a user device may be an EBIF application. In some embodiments, the system for providing a personalized selection of modified content items to a user device may be defined by a series of JAVA-based files that are received and run by a local virtual machine or other suitable middleware executed by control circuitry 604. In some of such embodiments (e.g., those employing MPEG-2 or other digital media encoding schemes), the system for providing a personalized selection of modified content items to a user device may be, for example, encoded and transmitted in an MPEG-2 object carousel with the MPEG audio and video packets of a program.

FIG. 7 shows illustrative devices and systems for providing a personalized selection of modified content items to a user device, in accordance with some embodiments of this disclosure. User equipment devices 707, 708, 710 (e.g., user device 101) may be coupled to communication network 706. Communication network 706 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 includes a media content source 702 and a server 704, which may comprise or be associated with database 705. Communications with media content source 702 and server 704 may be exchanged over one or more communications paths but are shown as a single path in FIG. 7 to avoid overcomplicating the drawing. In addition, there may be more than one of each of media content source 702 and server 704, but only one of each is shown in FIG. 7 to avoid overcomplicating the drawing. If desired, media content source 702 and server 704 may be integrated as one source device.

In some embodiments, server 704 may include control circuitry 711 and a storage 714 (e.g., RAM, ROM, Hard Disk, Removable Disk, etc.). Server 704 may also include an input/output path 712. I/O path 712 may provide device information, or other data, over a local area network (LAN) or wide area network (WAN), and/or other content and data to the control circuitry 711, which includes processing circuitry, and storage 714. The control circuitry 711 may be used to send and receive commands, requests, and other suitable data using I/O path 712, which may comprise I/O circuitry. I/O path 712 may connect control circuitry 704 (and specifically processing circuitry) to one or more communications paths.

Control circuitry 711 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 711 executes instructions for an emulation system application stored in memory (e.g., the storage 714). Memory may be an electronic storage device provided as storage 714 that is part of control circuitry 711.

Server 704 may retrieve guidance data from media content source 702, process the data as will be described in detail below, and forward the data to user equipment devices 707, 708 and 710. Media content source 702 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 702 may be the originator of content (e.g., a television broadcaster, a Webcast provider, etc.) or may not be the originator of content (e.g., an on-demand content provider, an Internet provider of content of broadcast programs for downloading, etc.). Media content source 702 may include cable sources, satellite providers, on-demand providers, Internet providers, over-the-top content providers, or other providers of content. Media content source 702 may also include a remote media server used to store different types of content (including video content selected by a user), in a location remote from any of the client devices. Media content source 702 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 704), which may be located centrally or at distributed locations, that provide cloud-based services to various types of users and devices connected via a network such as the Internet via communication network 706. In such embodiments, user equipment devices may operate in a peer-to-peer manner without communicating with a central server.

FIG. 8 is flowchart of detailed illustrative process 800 for providing a personalized selection of modified content items to a user device (e.g., user devices 104*a*-104*d* of FIGS. 1A-1E, user device 208 of FIGS. 2A-2B, user device 402*a* and 402*b* of FIGS. 4A and 4B) in accordance with some embodiments of this disclosure. Process 800 may be implemented at least in part by, for example, control circuitry 604 of FIG. 6, I/O path 602 (e.g., circuitry) of FIG. 6, and/or control circuitry 711 of FIG. 7. In various embodiments, the individual steps of process 800 may be implemented by one or more components of the devices and applications of FIGS. 1-7. Although the present disclosure may describe certain steps of process 800 (and of other processes described herein) as being implemented by certain components of the devices and applications of FIGS. 1-8, this is for purposes of illustration only, and it should be understood that other components of the devices and systems of FIGS. 1-7 may implement those steps instead. In addition, one or more steps of process 800 may be incorporated into or combined with one or more steps of any other process or embodiment.

Process 800 begins at 802, where the control circuitry (e.g., control circuitry 604 of FIG. 6 and/or control circuitry 711 of FIG. 7), stores a database (e.g., content item database 102*a*-102*c* of FIGS. 1A-1C, respectively) in memory (e.g., non-transitory memory 608 of FIG. 6, or storage 714 of FIG. 7), a plurality of content items wherein each content item is associated with a respective topic, a respective author, and a respective textual portion. At 804, the control circuitry segments the textual portion of each respective textual portion into textual segments. At 806, the control circuitry determines a dimension, a sentiment, and a sentiment intensity for each textual segment. At 808, the control circuitry stores each text segment and an indication of the corresponding determined dimensions, sentiments, and sentiment intensities in the database. At 810, the control circuitry monitors for a request for data about a topic (e.g., a search request such as "Veganism Benefits" or "Los Fuentes" from FIGS. 1B and 1C, respectively). At 812, the I/O circuitry determines if a request for data about a topic has been received. If, at 812, the I/O circuitry determines that a request for data about a topic has not been received (e.g., 812—No), process 800 returns to 810. If, at 812, the I/O circuitry determines that a request for data about a topic has been received (e.g., 812—Yes), process 800 proceeds to 814. At 814, the control circuitry accesses user preferences, from a user database (e.g., user database 106a or 106b of FIGS. 1B and 1C, respectively or user database 206 of FIG. 2A), comprising a plurality of dimensions, respective user sentiments, and respective user sentiment intensities.

At 816, the control circuitry identifies a subset of content items from a database of content items (e.g., content item database 102a-102c of FIGS. 1A-1C, respectively). In some implementations, the control circuitry identifies the subset of content items based on the accessed user preferences, as discussed in reference to FIGS. 1A-1E. At 818, the control circuitry determines a numerical score for each content item of the subset of content items (e.g., by calculating a numerical score based on relevance of the content item to the request for data about the topic or by retrieving a score from the content item database). At 820, the control circuitry determines, for each text segment of each content item, if the dimension, sentiment, and sentiment intensity of the textual segment match the accessed user preferences. If, at 820, the control circuitry determines that the dimension, sentiment, and sentiment intensity of the textual segment do not match the accessed user preferences (e.g., 820—No), process 800 proceeds to 822, where the control circuitry modifies the numerical score based on the difference. If, at 820, the control circuitry determines that the dimension, sentiment, and sentiment intensity of the textual segment match the accessed user preferences (e.g., 820—Yes), process 800 proceeds to 824, where the control circuitry modifies the numerical score based on the match. In some embodiments, at 822 and 824, the control circuitry additionally modifies the textual portion of the content item based on whether the dimension, sentiment, and sentiment intensity of the textual segment match or not. At 826, the I/O circuitry generates for output, at a device associated with the user (e.g., user devices 104a-104d of FIGS. 1A-1E, user device 208 of FIGS. 2A-2B, user device 402a and 402b of FIGS. 4A and 4B), the subset of content items based on the modified review scores. In some implementations, at 826, the I/O circuitry generates for output, at the device associated with the user, the subset of content items comprising the modified textual portions.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

storing, in a database, a plurality of content items wherein each content item is associated with a respective topic, a respective author, and a respective textual portion, wherein the respective author of each content item is associated with a set of dimensions, a respective author sentiment for each dimension, and a respective author sentiment intensity score for each dimension;

for each respective textual portion of each content item of the plurality of content items:

segmenting the respective textual portion into a plurality of textual segments;

determining, for each textual segment of each respective textual portion, a respective dimension, a respective sentiment, and a respective sentiment intensity score; and wherein the respective dimension, the respective sentiment, and the respective sentiment intensity score for each textual segment are caused to be stored in the database;

receiving, from a device associated with a user profile, a request for data about a topic;

accessing stored user preferences of the user profile wherein the stored user preferences comprise a plurality of dimensions, a respective user sentiment for each dimension, and a respective user sentiment intensity score for each dimension;

identifying a subset of the plurality of content items based at least in part on the topic;

identifying a numerical score for each content item of the subset, wherein the numerical score for each content item of the subset of content items is based at least in part on a comparison of (a) the plurality of dimensions, the respective user sentiment for each dimension, and the respective user sentiment intensity score for each dimension, and (b) the set of dimensions, the respective author sentiment for each dimension, and the respective author sentiment intensity score for each dimension;

generating a modified numerical score for a particular content item from the subset based at least in part on comparing the respective dimension, the respective sentiment, and the respective sentiment intensity score for each textual segment of the particular content item to the plurality of dimensions, the respective user sentiment for each dimension, and the respective user sentiment intensity score for each dimension, wherein the generating the modified numerical score for the particular content item is based at least in part on the set of dimensions, the respective author sentiment for each dimension, and the respective author sentiment intensity score for each dimension; and generating for output, at the device associated with the user profile, the particular content item, wherein the output is based at least in part on the modified numerical score.

2. The method of claim 1, wherein the generating for output comprises:

generating for output at the device associated with the user profile, the subset of content items arranged based at least in part on the modified numerical score of the particular content item.

3. The method of claim 1, further comprising:

generating a respective modified numerical score for each content item of the subset of content items based at least in part on comparing the respective dimension, the respective sentiment, and the respective sentiment intensity score for each textual segment of each content item of the subset of content items to the plurality of dimensions, the respective user sentiment for each dimension, and the respective user sentiment intensity score for each dimension; and wherein the generating for output comprises:

generating for output, at the device associated with the user profile, the subset of content items, wherein the output is based at least in part on the respective modified numerical score of each content item of the subset of content items.

4. The method of claim 1, wherein the identifying the subset of content items from the plurality of content items is based at least in part on comparing (a) the plurality of dimensions, the respective user sentiment for each dimension, and the respective user sentiment intensity score for each dimension, and (b) the set of dimensions, the respective author sentiment for each dimension, and the respective author sentiment intensity score for each dimension.

5. The method of claim 1, wherein:

the plurality of content items comprise reviews;

the respective author comprises a reviewing user;

the storing, in the database, the plurality of content items comprises storing a respective review score for each content item wherein the respective review score for each content item is based at least in part on input received from a respective device of the respective author of each content item; and the identifying the numerical score for each content item of the subset comprises accessing the respective review score for each content item from the database.

6. The method of claim 1, wherein the identifying the numerical score for each content item of the subset comprises:

ranking each content item based at least in part on comparing the request for data about the topic to the respective textual portion of each content item of the subset of content items to determine a respective relevance to the topic.

7. The method of claim 1, wherein the stored user preferences of the user are determined based on user activity across a plurality of applications.

8. The method of claim 1, wherein the generating for output the particular content item comprises:

providing an indication that the numerical score of the particular content item was modified;

providing a user-selectable option corresponding to the modification of the numerical score of the particular content item;

receiving a selection, from the device associated with the user profile, of the user-selectable option; and generating for display, at the device associated with the user, the particular content item without modifications and an indication of a reason for the modification of the numerical score of the particular content item.

9. The method of claim 8, further comprising:

generating for display, at the device associated with the user profile, additional user-selectable options corresponding to a user approval or disapproval of the modification of the numerical score of the particular content item.

10. The method of claim 1, wherein the generating for output comprises generating for output, at the device associated with the user profile, the particular content item and an indication of the modified numerical score of the particular content item.

11. A system comprising:

control circuitry configured to:

store, in a database, a plurality of content items wherein each content item is associated with a respective topic, a respective author, and a respective textual portion, wherein the respective author of each content item is associated with a set of dimensions, a respective author sentiment for each dimension, and a respective author sentiment intensity score for each dimension;

for each respective textual portion of each content item of the plurality of content items:

segment the respective textual portion into a plurality of textual segments;

determine, for each textual segment of each respective textual portion, a respective dimension, a respective sentiment, and a respective sentiment intensity score; and wherein the respective dimension, the respective sentiment, and the respective sentiment intensity score for each textual segment are caused to be stored in the database;

receive, from a device associated with a user profile, a request for data about a topic;

access stored user preferences of the user profile wherein the stored user preferences comprise a plurality of dimensions, a respective user sentiment for each dimension, and a respective user sentiment intensity score for each dimension;

identify a subset of the plurality of content items based at least in part on the topic;

identify a numerical score for each content item of the subset, wherein the numerical score for each content item of the subset of content items is based at least in part on a comparison of (a) the plurality of dimensions, the respective user sentiment for each dimension, and the respective user sentiment intensity score for each dimension, and (b) the set of dimensions, the respective author sentiment for each dimension, and the respective author sentiment intensity score for each dimension;

generate a modified numerical score for a particular content item from the subset based at least in part on comparing the respective dimension, the respective sentiment, and the respective sentiment intensity score for each textual segment of the particular content item to the plurality of dimensions, the respective user sentiment for each dimension, and the respective user sentiment intensity score for each dimension, wherein the generating the modified numerical score for the particular content item is based at least in part on the set of dimensions, the respective author sentiment for each dimension, and the respective author sentiment intensity score for each dimension; and Input/Output (I/O) circuitry configured to:

generate for output, at the device associated with the user profile, the particular content item, wherein the output is based at least in part on the modified numerical score.

12. The system of claim 11, wherein the I/O circuitry is further configured to generate for output the particular content item by:

generating for output at the device associated with the user profile, the subset of content items arranged based at least in part on the modified numerical score of the particular content item.

13. The system of claim 11, wherein the control circuitry is further configured to:

generate a respective modified numerical score for each content item of the subset of content items based at least in part on comparing the respective dimension, the respective sentiment, and the respective sentiment intensity score for each textual segment of each content item of the subset of content items to the plurality of dimensions, the respective user sentiment for each dimension, and the respective user sentiment intensity score for each dimension; and wherein the I/O circuitry is further configured to generate for output the particular content item by:

generating for output, at the device associated with the user profile, the subset of content items, wherein the output is based at least in part on the respective modified numerical score of each content item of the subset of content items.

14. The system of claim 11, wherein the control circuitry is further configured to identify the subset of content items from the plurality of content items based at least in part on comparing (a) the plurality of dimensions, the respective user sentiment for each dimension, and the respective user sentiment intensity score for each dimension, and (b) the set of dimensions, the respective author sentiment for each dimension, and the respective author sentiment intensity score for each dimension.

15. The system of claim 11, wherein:

the plurality of content items comprise reviews;

the respective author comprises a reviewing user;

the control circuitry is further configured to store, in the database, the plurality of content items by storing a respective review score for each content item wherein the respective review score for each content item is based at least in part on input received from a respective device of the respective author of each content item; and the control circuitry is further configured to identify the numerical score for each content item of the subset by accessing the respective review score for each content item from the database.

16. The system of claim 11, wherein the control circuitry is further configured to identify the numerical score for each content item of the subset by:

ranking each content item based at least in part on comparing the request for data about the topic to the respective textual portion of each content item of the subset of content items to determine a respective relevance to the topic.

17. A method comprising:

storing, in a database, a plurality of content items wherein each content item is associated with a respective topic, a respective author, and a respective textual portion;

for each respective textual portion of each content item of the plurality of content items:

segmenting the respective textual portion into a plurality of textual segments;

determining, for each textual segment of each respective textual portion, a respective dimension, a respective sentiment, and a respective sentiment intensity score; and wherein the respective dimension, the respective sentiment, and the respective sentiment intensity score for each textual segment are caused to be stored in the database;

receiving, from a device associated with a user profile, a request for data about a topic;

accessing stored user preferences of the user profile wherein the stored user preferences comprise a plurality of dimensions, a respective user sentiment for each dimension, and a respective user sentiment intensity score for each dimension;

identifying a subset of the plurality of content items based at least in part on the topic;

identifying a numerical score for each content item of the subset;

generating a modified numerical score for a particular content item from the subset based at least in part on comparing the respective dimension, the respective sentiment, and the respective sentiment intensity score for each textual segment of the particular content item to the plurality of dimensions, the respective user sentiment for each dimension, and the respective user sentiment intensity score for each dimension;

generating a modified respective textual portion of the particular content item by modifying at least one textual segment of the particular content item based at least in part on comparing the respective dimension, the respective sentiment, and the respective sentiment intensity score for each text segment of the particular content item to the plurality of dimensions, the respective user sentiment for each dimension, and the respective user sentiment intensity score for each dimension;

generating for output, at the device associated with the user profile, the particular content item, wherein the output is based at least in part on the modified numerical score; and generating for output, at the device associated with the user, the particular content item comprising the modified respective textual portion of the particular content item.

18. The method of claim 17, wherein the generating for output the particular content item comprising the modified respective textual portion further comprises:

providing an indication that the respective textual portion of the particular content item was modified;

providing a user-selectable option corresponding to the modification of the at least one textual segment of the particular content item;

receiving a selection, from the device associated with the user profile, of the user-selectable option; and generating for display, at the device associated with the user profile, the unmodified particular content item and an indication of a reason for the modification of the at least one textual segment of the particular content item.

* * * * *